United States Patent
Chen

(10) Patent No.: US 8,773,978 B2
(45) Date of Patent: Jul. 8, 2014

(54) SYSTEM AND METHOD FOR PROTECTING INGRESS AND EGRESS OF A POINT-TO-MULTIPOINT LABEL SWITCHED PATH

(75) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 185 days.

(21) Appl. No.: 12/983,587

(22) Filed: Jan. 3, 2011

(65) Prior Publication Data

US 2011/0199891 A1 Aug. 18, 2011

Related U.S. Application Data

(60) Provisional application No. 61/304,645, filed on Feb. 15, 2010, provisional application No. 61/309,267, filed on Mar. 1, 2010.

(51) Int. Cl.
*H04L 1/22* (2006.01)

(52) U.S. Cl.
USPC ........... 370/218; 370/216; 370/217; 370/221; 370/225

(58) Field of Classification Search
None
See application file for complete search history.

(56) References Cited

U.S. PATENT DOCUMENTS

| | | | |
|---|---|---|---|
| 2002/0176370 A1* | 11/2002 | Ohba et al. | 370/252 |
| 2003/0028818 A1* | 2/2003 | Fujita | 714/4 |
| 2003/0110287 A1* | 6/2003 | Mattson | 709/238 |
| 2007/0091792 A1* | 4/2007 | Chandra et al. | 370/227 |
| 2008/0123521 A1* | 5/2008 | Vasseur et al. | 370/217 |
| 2008/0123524 A1* | 5/2008 | Vasseur et al. | 370/228 |
| 2009/0268731 A1* | 10/2009 | Narayanan et al. | 370/390 |
| 2010/0027415 A1* | 2/2010 | So et al. | 370/225 |
| 2010/0177631 A1 | 7/2010 | Chen et al. | |

OTHER PUBLICATIONS

IETF—RFC 4379 Detecting MPLS data plane failures, Feb. 2006.*
Le Roux et al. Fast reroute with P2MP bypass IETF Draft Mar. 2008.*
Pan, Ed., et al., "Fast Reroute Extensions to RSVP-TE for LSP Tunnels," RFC 4090, May 2005.
Aggarwal, Ed., et al., "Extensions to Resource Reservation Protocol—Traffic Engineering (RSVP-TE) for Point-to-Multipoint TE Label Switched Paths (LSPs)," RFC 4875, May 2007.
Cao, "Head Node Protection Extensions to RSVP-TE for LSP Tunnels," draft-cao-mpls-te-p2mp-head-protection-01.txt, Nov. 17, 2007.

(Continued)

*Primary Examiner* — Chirag Shah
*Assistant Examiner* — Rina Pancholi
(74) *Attorney, Agent, or Firm* — Conley Rose, P.C.; Grant Rodolph; Rayhao A. Chung

(57) ABSTRACT

A network comprising a first edge node, a second edge node, a third edge node that backs up either the first edge node or the second edge node, and an internal node coupled to the first edge node, the second edge node, and the third edge node, wherein a point-to-multipoint (P2MP) label switched path (LSP) extends across the network from the first edge node, through the internal node, and to the second edge node, and wherein a LSP sub-tree extends between the third edge node and the internal node, but does not extend across the network.

22 Claims, 19 Drawing Sheets

(56) References Cited

OTHER PUBLICATIONS

Chen, et al., "Extensions to RSVP for P2MP LSP Egress Local Protection," draft-chen-mpls-p2mp-egress-protection-01.txt, Jul. 12, 2010.

Chen, et al., "Extensions to RSVP-TE for P2MP LSP Ingress Local Protection," draft-chen-mpls-p2mp-ingress-protection-01.txt, Jul. 12, 2010.

Awduche, D., et al., "RSVP-TE: Extensions to RSVP for LSP Tunnels," RFC 3209, Dec. 2001.

Bradner, S., "Key words for use in RFCs to Indicate Requirement Levels", BCP 14, RFC 2119, Mar. 1997.

Narten, T., "Assigning Experimental and Testing Numbers Considered Useful", BCP 82, RFC 3692, Jan. 2004.

Braden, B., Zhang, L., Berson, S., Herzog, S., and S. Jamin, "Resource ReSerVation Protocol (RSVP)—Version 1 Functional Specification", RFC 2205, Sep. 1997.

Rosen, E., Viswanathan, A., and R. Callon, "Multiprotocol Label Switching Architecture", RFC 3031, Jan. 2001.

Berger, L., "Generalized Multi-Protocol Label Switching (GMPLS) Signaling Resource Reservation Protocol-Traffic Engineering (RSVP-TE) Extensions", RFC 3473, Jan. 2003.

Yasukawa, S., "Signaling Requirements for Point-to-Multipoint Traffic-Engineered MPLS Label Switched Paths (LSPs)", RFC 4461, Apr. 2006.

Le Roux, J.L., et al, "P2MP MPLS-TE Fast Reroute with P2MP Bypass Tunnels," draft-ietf-mpls-p2mp-te-bypass-02.txt, Mar. 2008, 15 pages.

\* cited by examiner

SYSTEM AND METHOD FOR PROTECTING INGRESS AND EGRESS OF A POINT-TO-MULTIPOINT LABEL SWITCHED PATH

CROSS-REFERENCE TO RELATED APPLICATIONS

The present application claims the benefit of U.S. Provisional Patent Application No. 61/304,645 filed Feb. 15, 2010 by Huaimo Chen and entitled "System and Method for Protecting Ingress of a Point-to-Multipoint Label Switched Path," and U.S. Provisional Patent Application No. 61/309,267 filed Mar. 1, 2010 by Huaimo Chen and entitled "System and Method for Protecting Egress of a Point-to-Multipoint Label Switched Path," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks, a Traffic Engineering (TE) Label Switched Path (LSP) can be established using a Resource Reservation Protocol-TE (RSVP-TE) for a given path. A path can be provided by a Path Computation Client (PCC) and/or a Path Computation Element (PCE). For example, the PCC may request a path or route from the PCE, which computes the path and forwards the computed path information back to the PCC. The path can be a Point-to-Multipoint (P2MP) path from a source node to a plurality of destination nodes.

The Internet Engineering Task Force (IETF) request for comment (RFC) 4090 entitled "Fast Reroute Extensions to RSVP-TE for LSP Tunnels," which is published in http://ietfreportisoc.org/rfc/rfc4090.txt and incorporated herein by reference, describes two methods to backup point-to-point (P2P) LSP tunnels or paths at local repair points. The local repair points may comprise a plurality of internal nodes between an ingress node and an egress node along the path. The first method is a one-to-one backup method, where a detour backup P2P LSP for each protected P2P LSP is created at each potential point of local repair. The second method is a facility bypass backup protection method, where a bypass backup P2P LSP tunnel is created using MPLS label stacking to protect a potential failure point for a set of P2P LSP tunnels. The bypass backup tunnel can protect a set of P2P LSPs that have similar backup constraints.

The IETF RFC 4875 entitled "Extensions to RSVP-TE for Point-to-Multipoint TE Label Switched Paths (LSPs)", which is published in http://ietfreportisoc.org/rfc/rfc4875.txt and incorporated herein by reference, describes how to use the one-to-one backup method and facility bypass backup method to protect a link or internal node failure on the path of a P2MP LSP. However, there is no mention of protecting locally an ingress or egress node failure in a protected P2MP LSP.

SUMMARY

In one embodiment, the disclosure includes a network comprising a first edge node, a second edge node, a third edge node that backs up either the first edge node or the second edge node, and an internal node coupled to the first edge node, the second edge node, and the third edge node, wherein a P2MP LSP extends across the network from the first edge node, through the internal node, and to the second edge node, and wherein a LSP sub-tree extends between the third edge node and the internal node, but does not extend across the network.

In another embodiment, the disclosure includes an apparatus comprising a backup ingress node coupled to an ingress node of a P2MP LSP and to a plurality of next-hop nodes for the ingress node along the P2MP LSP via a P2MP LSP sub-tree, wherein the P2MP LSP extends to a plurality of egress nodes and is configured to multicast data from the ingress node to the egress nodes, wherein the P2MP LSP sub-tree does not extend to the egress nodes, wherein the backup ingress node and the ingress node are both coupled to an external node, and wherein the backup ingress node is configured to ensure data delivery from the external node onto the P2MP LSP via the backup P2MP LSP sub-tree when the ingress node fails.

In yet another embodiment, the disclosure includes an apparatus comprising a backup egress node coupled to an egress node of a P2MP LSP and to a previous-hop node for the egress node along the P2MP LSP via a backup LSP sub-tree, wherein the P2MP LSP extends across a network from an ingress node to the egress node and a plurality of other egress nodes, wherein the P2MP LSP is configured to multicast data from the ingress node to the egress node and the other egress nodes, wherein the backup egress node and the egress node are both coupled to an external node, and wherein the backup egress node delivers the data from the P2MP LSP to the external node via the backup LSP sub-tree when the egress node fails.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
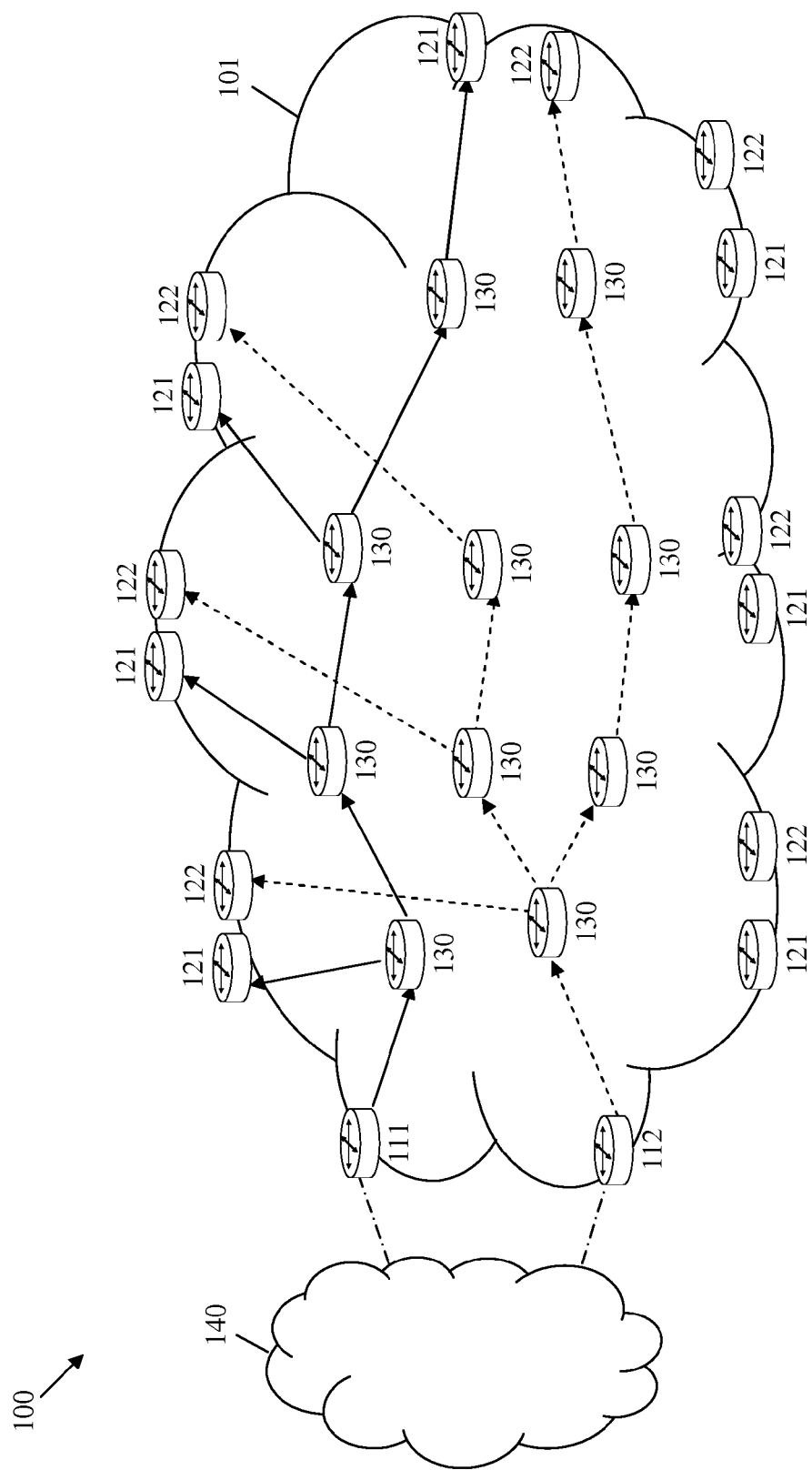
FIG. 1 is a schematic diagram of an embodiment of a label switched system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Current methods for protecting an ingress node in a P2MP LSP that extends from the ingress node to a plurality of destination nodes may include using a backup P2MP LSP approach. The backup P2MP LSP may extend from a backup ingress node to the destination nodes. The backup P2MP LSP approach is described in U.S. Patent Application Publication No. 2008/0123524, entitled "Failure Protection for P2MP Tunnel Head-end Node," which is incorporated herein by reference. The ingress node may forward traffic to the destination nodes along the P2MP LSP. When the ingress node fails, the backup node may instead forward the traffic to the destination nodes along the backup P2MP LSP. The backup P2MP LSP approach may need additional network resources, such as network component and link bandwidth, to establish and maintain the P2MP LSP and the backup P2MP LSP.

Other methods for protecting an internal node in a P2MP may be extended to protect an ingress node in the P2MP, such as described in U.S. Patent Application Publication No. 2010/0177631, entitled "Protecting Ingress and Egress of a Label Switched Path," which is incorporated herein by reference. The ingress node of the P2MP LSP may be protected by establishing a set of backup detour P2P LSPs or a set of backup facility bypass P2P LSPs from a backup ingress node to each of a plurality of next-hop nodes of the ingress node. Alternatively, a P2MP bypass LSP may be established from a backup ingress node to a plurality of next-hop nodes of the ingress node. As used herein, a next-hop node may be defined as the subsequent node along a LSP, while the previous hop node may be defined as a prior node along the LSP. The next and previous hop nodes may be either coupled to the reference node without any intervening label swaps, or directly coupled to the reference node with no intervening nodes. When the ingress node fails, the backup ingress node may instead forward the traffic on the set of backup detour P2P LSPs, the set of backup facility bypass P2P LSPs, or the P2MP bypass LSP, which may merge into the P2MP LSP at the next-hop nodes of the ingress node. The backup ingress node may send or refresh a plurality of PATH messages for the P2MP LSP to the next-hop nodes and receive and process a plurality of RESerVation (RESV) messages for the P2MP LSP from the next-hop nodes. These methods may need additional steps for refreshing the PATH messages and processing the RESV messages.

Additionally, some methods for protecting an egress node in a P2MP LSP may use a backup tunnel from a branch node upstream of the egress node to a backup egress node. Such methods may need to implement an additional tunnel protocol to establish the backup tunnel, which may require additional network operation.

Disclosed herein is a system and method for protecting an ingress node in a P2MP LSP. The P2MP LSP may be configured across an ingress node, a plurality of internal nodes, and a plurality of egress nodes. The ingress node and egress nodes may be edge nodes in a network. A backup ingress node, which may also be an edge node, may be designated to protect the ingress node. The backup ingress node may also communicate with the ingress node and detect a failure of the ingress node. When the ingress node fails, the backup ingress node may receive traffic destined for the ingress node and to be transported by the P2MP LSP, and forward the traffic to a plurality of next-hop nodes of the ingress node of the P2MP LSP. The traffic may be forwarded from the backup ingress node via a backup P2MP LSP sub-tree. During an ingress node failure, the traffic may be routed via the backup P2MP LSP sub-tree and then merged into the P2MP LSP, e.g. without using a second backup P2MP LSP that extends from the backup ingress to the egress nodes. Doing so may conserve system resources and may eliminate the need for reverse P2P LSPs that are required by some of the prior art.

Also disclosed is a system and method for protecting an egress node in the P2MP LSP. A backup egress node, which may be an edge node, may be designated to protect the egress node. A previous-hop node of the egress node may communicate with the egress node and detect a failure of the egress node. When the egress node fails, the previous-hop node may receive traffic destined for the egress node (and subsequently to an external node coupled to the egress node), and forward the traffic to the backup egress node via a P2MP sub-LSP. In turn, the backup egress node may forward the traffic to the external node.

FIG. 1 illustrates one embodiment of a label switched system 100, where a plurality of P2MP LSPs may be established between at least some of the components. The P2MP LSPs may be used to transport data traffic, e.g. using packets and packet labels for routing. The label switched system 100 may comprise a label switched network 101, which may be a packet switched network that transports data traffic using packets or frames along network paths or routes. The packets may be routed or switched along the paths, which may be established by a label switching protocol, such as MPLS or generalized MPLS (GMPLS).

The label switched network 101 may comprise a plurality of edge nodes, including a first ingress node 111, a second ingress node 112, a plurality of first egress nodes 121, and a plurality of second egress nodes 122. As used herein, an edge node may be defined as a node in a network that is directly coupled to both internal nodes within the network and at least one node that is external to the network. The edge node may also be coupled to other edge nodes. In some cases, the first ingress node 111 and second ingress node 112 may be referred to as root nodes, and the first egress nodes 121 and second egress nodes 122 may be referred to as leaf nodes. Additionally, the label switched network 101 may comprise a plurality of internal nodes 130, which may communicate with one another and with the edge nodes. As used herein, the internal nodes 130 may be defined as nodes within a network that are only coupled to other nodes within the network (e.g. other internal nodes and edge nodes), and not any nodes that are external to the network. The first ingress node 111 and the second ingress node 112 may communicate with a first external network 140, such as an Internet protocol (IP) network, which may be coupled to the label switched network 101. As such, the first ingress node 111 and the second ingress node 112 may transport data, e.g. data packets, between the label switch network 101 and the external network 140. Further, some of the first egress nodes 121 and second egress nodes 122 may be grouped in pairs, where each pair may be coupled to a second external network or a client (not shown).

In an embodiment, the edge nodes and internal nodes 130 may be any devices or components that support transportation of the packets through the label switched network 101. For example, the network nodes may include switches, routers, or various combinations of such devices. The network nodes may comprise a receiver that receives packets from other network nodes, logic circuitry that determines which network nodes to send the packets to, and a transmitter that transmits the packets to the other network nodes. In some embodiments, at least some of the network nodes may be label switched routers (LSRs), which may be configured to modify or update the labels of the packets transported in the label switched network 101. Further, at least some of the edge nodes may be label edge routers (LERs), which may be configured to insert or remove the labels of the packets transported between the label switched network 101 and the external network 140, the second external network, or the client.

The label switched network 101 may comprise a first P2MP LSP, which may be established to multicast data traffic from the first external network 140 to the second external networks or clients. The first P2MP LSP may be configured across the first ingress node 111 and at least some of the first egress nodes 121. The first P2MP LSP is shown using solid arrow lines in FIG. 1. To protect the first P2MP LSP against link or node failures, the label switched network 101 may comprise a second P2MP LSP, which may be configured across the second ingress node 112 and at least some of the second egress nodes 122. Specifically, each second egress node 122 may be paired with a first egress node 121 of the first P2MP LSP. The second P2MP LSP may also be configured across the same and/or different internal nodes 130 as the first P2MP LSP. The second P2MP LSP may provide a backup path to the first P2MP LSP and may be used to forward traffic from the first external network 140 to the second external networks or clients when the ingress node or any egress node of the first P2MP LSP fails. The second P2MP LSP is shown using dashed arrow lines in FIG. 1.

Reserving a second P2MP LSP as a backup path to the first P2MP LSP may be resource consuming since the second P2MP LSP may require additional network bandwidth, which may be comparable to the reserved bandwidth of the first P2MP LSP. Further, when the ingress node of the first P2MP LSP fails, rerouting traffic via a corresponding second P2MP LSP may cause a delay in traffic delivery. Even when the second P2MP LSP carries the same traffic as the first P2MP LSP, when the ingress node of the first P2MP LSP fails, the delay for a second external network or a client to determine the failure and switch to a second egress node for receiving the traffic may be long. Such delay may not be acceptable in some systems, e.g. for real time services such as Voice over IP (VOIP) and/or IP television (IPTV).

Figure 2:
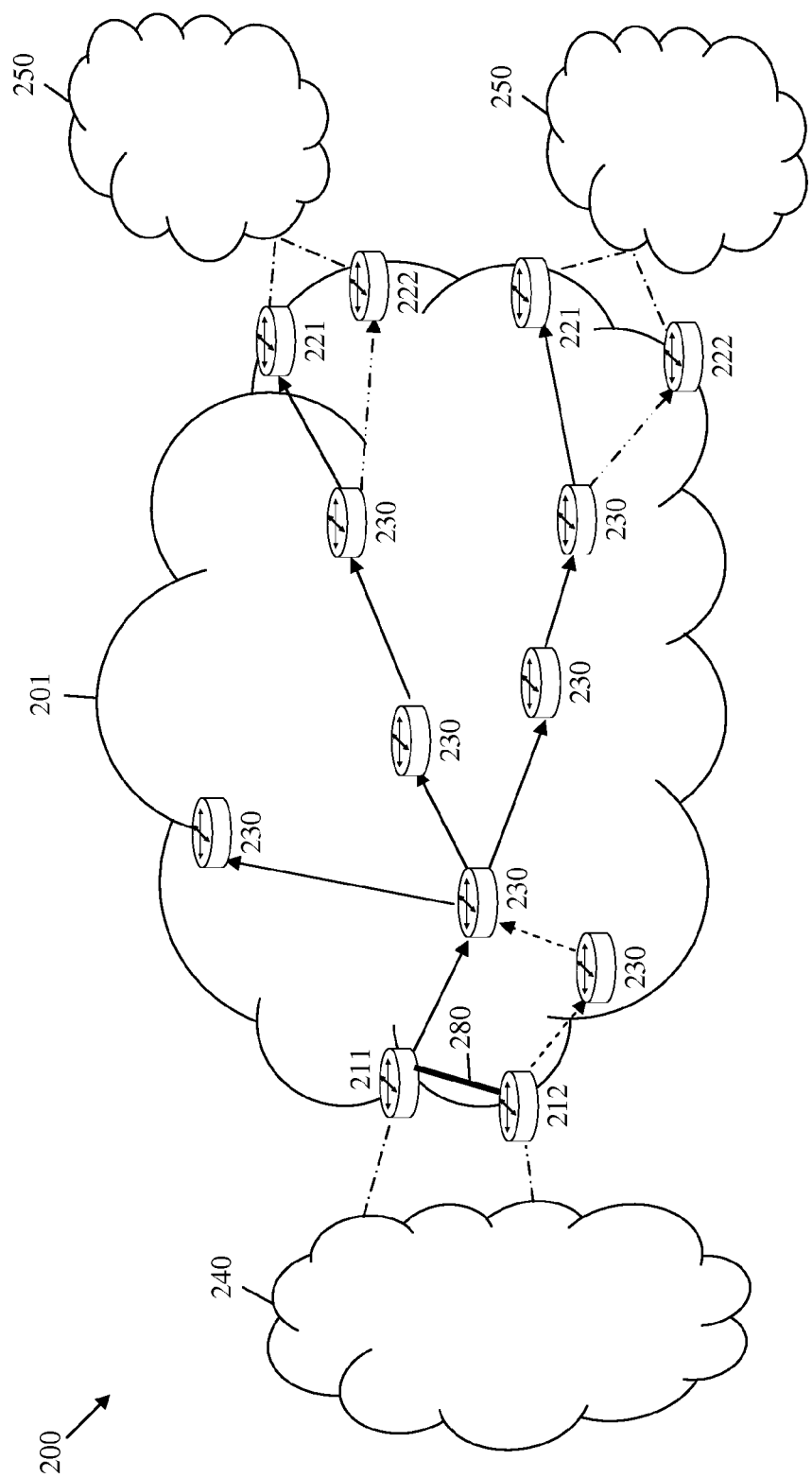
FIG. 2 is a schematic diagram of another embodiment of the label switched system.

FIG. 2 illustrates one embodiment of another label switched system 200, where a plurality of TE LSPs may be established between at least some of the components. The label switched system 200 may comprise a label switched network 201, which may be a packet switched network. The label switched network 201 may comprise a plurality of edge nodes, which may comprise a first ingress node 211, a second ingress node 212, a plurality of first egress nodes 221, and a plurality of second egress nodes 222. Additionally, the label switched network 201 may comprise a plurality of internal nodes 230, which may communicate with one another and with the edge nodes. The edge nodes and the internal nodes 230 may be configured substantially similar to the corresponding components of the label switch network 101.

The label switch network 201 may communicate with a first external network 240 via the first ingress node 211 and the second ingress node 212, and with a plurality of second external networks 250 via the first egress nodes 221 and the second egress nodes 222. Specifically, the label switch network 201 may communicate with each of the second external networks 250 via a first egress node 221 and second egress node 222. Alternatively, the first egress node 221 and second egress node 222 may communicate with a client.

Figure 4:
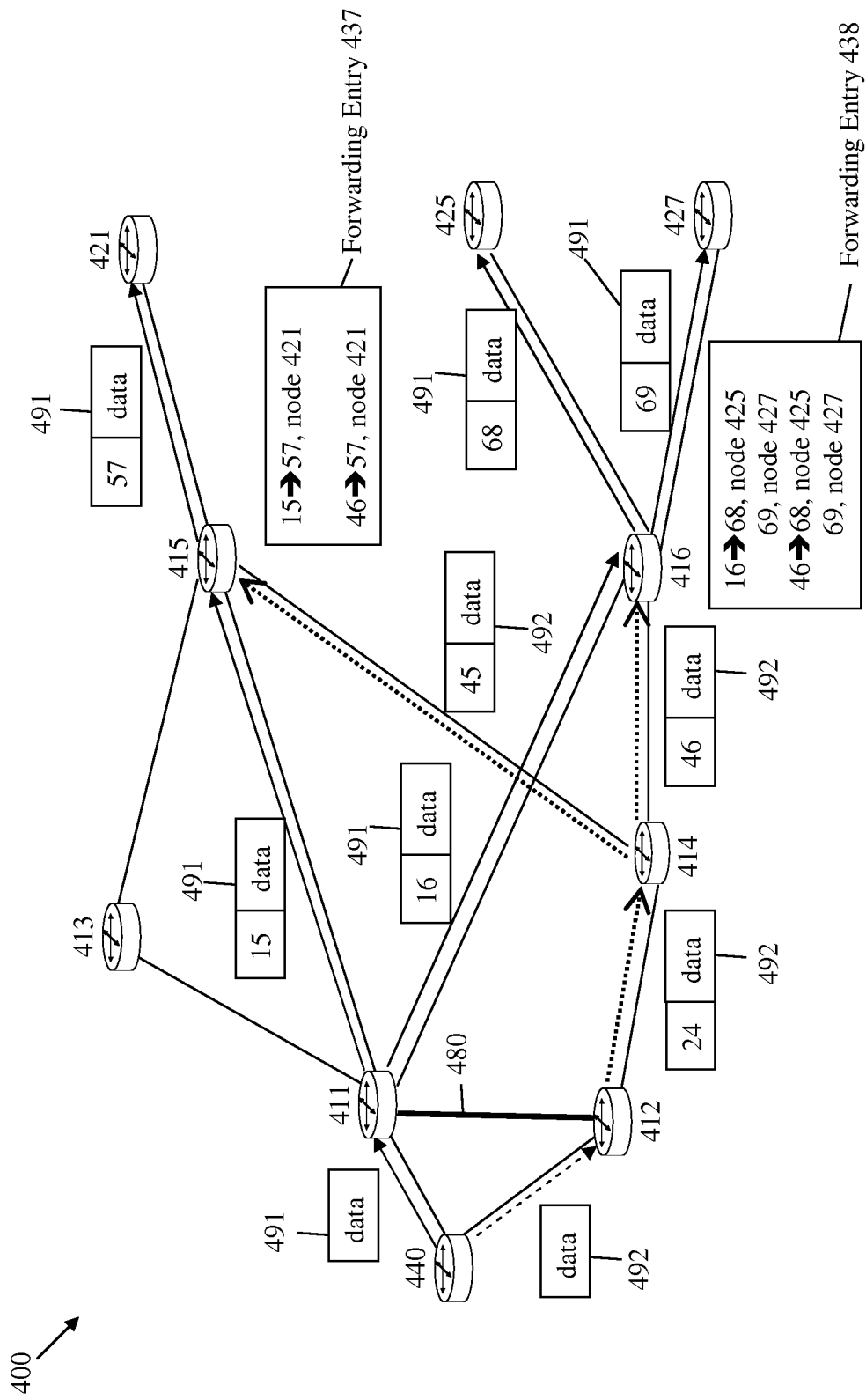
FIG. 4 is a schematic diagram of an embodiment of an ingress node protection scheme.
Figure 6:
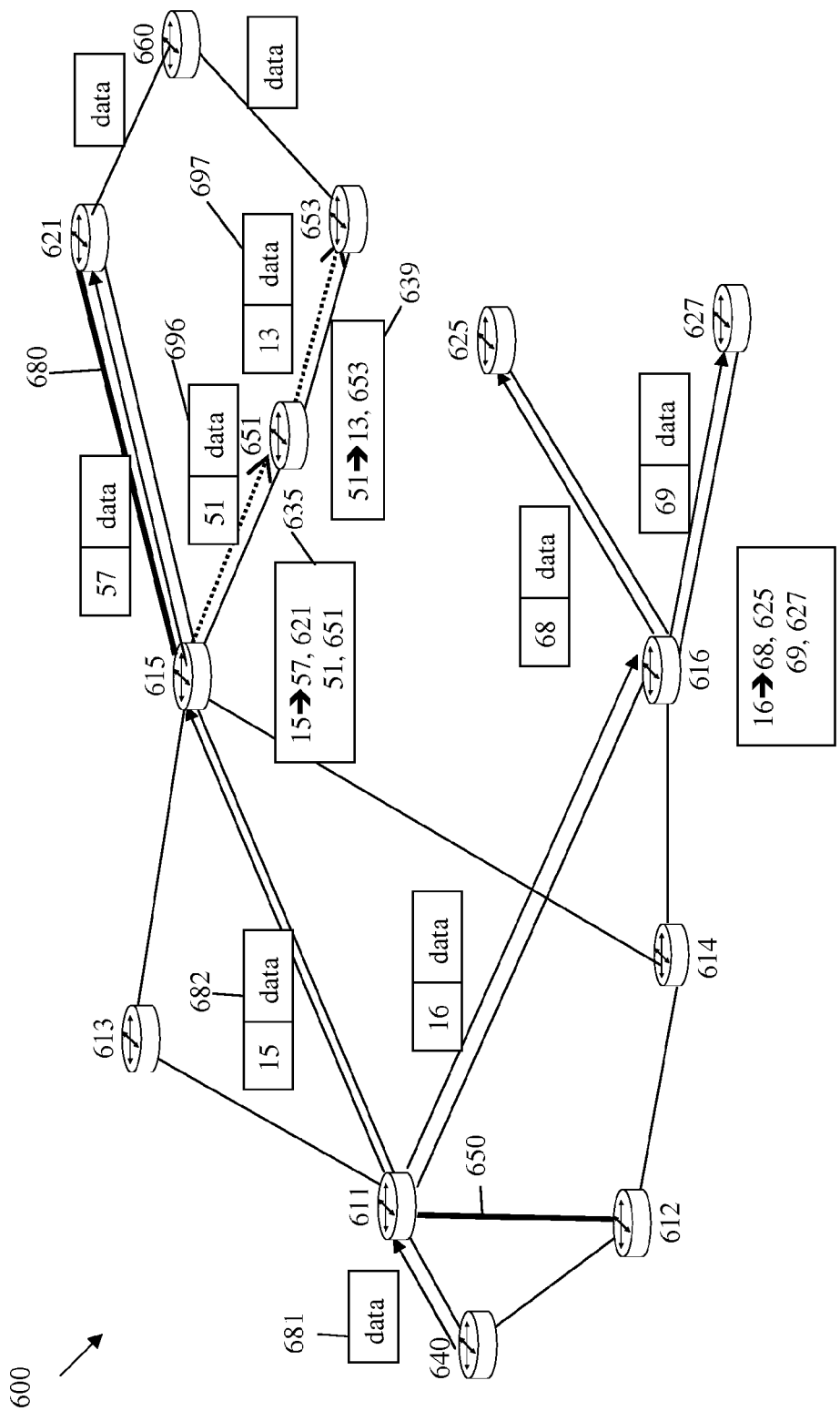
FIG. 6 is a schematic diagram of an embodiment of an egress node protection scheme.

The label switched network 201 may comprise a P2MP LSP, which may be established to multicast data traffic from the first external network 240 to the second external networks 250, or alternatively to clients coupled to the label switched network 201. The P2MP LSP may be configured across the first ingress node 211 and at least some of the first egress nodes 221. The P2MP LSP may also comprise a plurality of internal nodes 230. In an embodiment, the second ingress node 212 may be designated as a backup node for the first ingress node 211 to protect the P2MP LSP against ingress node failure. Accordingly, the second ingress node 212 may be configured to communicate with the first ingress node 211, establish a backup P2MP LSP sub-tree (indicated by dashed line arrows) for protecting the first ingress node 211, and re-route packets normally sent to the first ingress node 211 when the first ingress node 211 fails. Specifically, the re-routed packets may be first transported via the backup P2MP LSP sub-tree, and then subsequently merged onto the P2MP LSP prior to reaching the first egress node 221 and the second egress node 222. As used herein, the P2MP LSP sub-tree may be defined as a P2P or P2MP LSP that extends between a backup edge node and an internal node. In various embodiments, the P2MP LSP sub-tree may be from a backup ingress node to an internal node or a plurality of internal nodes (as shown in FIGS. 2 and 4) or from an internal node to a backup egress node (as shown in FIGS. 2 and 6).

The second ingress node 212 may be selected using a PCE, for instance based on network topology information. The PCE may inform the first ingress node 211 of the selected second ingress node 212. The first ingress node 211 may then communicate with the second ingress node 212, e.g. by establishing a communication channel with the second ingress node 212. Thus, the first ingress node 211 may send information about the P2MP LSP directly to the second ingress node 212. The information sent to the second ingress node 212 may comprise constraints on the P2MP LSP, an Explicit Route Object (ERO), a Record Route Object (RRO), or combinations thereof. The information may be sent in an Open Shortest Path First (OSPF) type 9 Link State Advertisement (LSA) with a new Type Length Value (TLV) for the information. Alternatively, the information may be sent in a RSVP-TE PATH message with a new flag indicating that the information in the message is for protecting the ingress node. The second ingress node 212 may receive this information from the first ingress node 211 and use the information to establish a backup P2MP LSP sub-tree. For instance, the second ingress node 212 may initiate a backup P2MP LSP sub-tree from the second ingress node 212 to a plurality of next-hop nodes of the first ingress node 211 of the P2MP LSP. The second ingress node 212 may be aware of the next-hop nodes from the RRO that may be sent from the first ingress node 211. The backup P2MP LSP sub-tree may be created by computing a path from the second ingress node 212 to the next-hop nodes, sending a PATH message along the computed path, receiving a RESV message in return, and creating a forwarding state for the backup P2MP LSP sub-tree. The PATH and RESV messages may be similar to the PATH and RESV messages defined by IETF.

After selecting the second ingress node 212 as a backup node for the first ingress node 211, the second ingress node 212 may be configured to detect a failure in the first ingress node 211 using a failure detection mechanism. For instance, the failure detection mechanism may be a Bi-directional Forwarding Detection (BFD) over an interface 280 or a P2P LSP, which may be established between the first ingress node 211 and the second ingress node 212. When the second ingress node 212 detects a failure in the first ingress node 211, the second ingress node 212 may receive the traffic, e.g. from the first external network 240, and then forward the traffic via the backup P2MP LSP sub-tree to the next-hop nodes of the first ingress node 211 of the P2MP LSP. The backup P2MP LSP sub-tree may be merged with the P2MP LSP at the next-hop nodes. In an embodiment, if the traffic is initially received by both the first ingress node 211 and the second ingress node 212, then the second ingress node 212 may also forward the traffic via the backup P2MP LSP sub-tree to the next-hop nodes of the first ingress node 211 of the P2MP LSP upon detecting a failure in the first ingress node 211. Thus, when a failure occurs in the first ingress node 211, at least some of the internal nodes 230, the first egress nodes 221, the second egress nodes 222, and/or the second external networks 250 may be unaware of the failure.

Additionally, at least some of the second egress nodes 222, which may be paired with the first egress nodes 221, may be designated as backup nodes for the first egress nodes 221 to protect against egress node failure. Accordingly, a previous-hop node that may precede a first egress node 221 along the P2MP LSP may be configured to receive information about a second egress node 222, establish a backup LSP (indicated by dashed with two dots line arrows) for the first egress node 221, and re-route packets that would normally be sent to the first egress node 221 instead to the second egress node 222 via the backup LSP. The backup LSP may be a backup P2MP LSP sub-tree as defined above.

The second egress node 222 may be selected using a PCE, for instance based on network topology information. The PCE may inform the first egress node 221 of the selected second egress node 222. Additionally or alternatively, the PCE may inform the first ingress node 211 of the selected second egress node 222. The information about the second egress node 222 may then be sent, e.g. by a network management entity, to the first egress node 221 and/or the previous-hop node of the first egress node 221. The information about the second egress node 222 may be sent to the previous-hop node in a message. For instance, when the first egress node 221 has the information about the selected second egress node 222, the first egress node 221 may send the information to the previous-hop node, e.g. in a RESV message. The first egress node 221 may send the information about forwarding the data received from the P2MP LSP to the client to the second egress node 222 in an OSPF type 9 LSA with a TLV for the information. The second egress node 222 may create a forwarding entry according to the information received for forwarding the data to the client. Alternatively, the first egress node 221 may send the backup egress node (the second egress node 222) the information about forwarding the data received from the P2MP LSP to the client via the previous-hop node of the egress node in a RSVP-TE RESV message and then the previous-hop node sends the backup egress node the information in a RSVP-TE PATH message. If the first ingress node 211 has the information about the selected second egress node 222, then the first ingress node 211 may send the information to the previous-hop node, e.g. in a PATH message.

After receiving the message, the previous-hop node may establish a backup LSP from the previous-hop node to the second egress node 222. The backup LSP may be created by computing a path from the previous-hop node to the second egress node 222, sending the PATH message along the computed path, receiving a RESV message in return, and creating a forwarding state for the backup LSP. The backup LSP may be a P2MP LSP sub-tree, a P2P bypass tunnel or a P2P detour tunnel, as described below. When the previous-hop node detects a failure in the first egress node 221, the previous-hop node may forward the traffic, via the backup LSP, to the second egress node 222 instead of the first egress node 221. The second egress node 222 may then deliver the traffic to its destination, e.g. to the second external network 250 or a client.

Selecting a backup ingress node for the first ingress node 211 and/or a backup egress node for any of the first egress nodes 221 may provide end-to-end protection in a P2MP LSP. By using the backup ingress and/or egress nodes, the end-to-end P2MP LSP protection may be localized to the initially configured (or primary) ingress and/or egress nodes of the P2MP LSP. This localized protection may provide more efficient protection to the edge nodes in comparison to using a second backup P2MP LSP from a second ingress node to all second egress nodes when an ingress or egress node fails. For instance, creating a backup P2MP LSP sub-tree from the backup ingress to the next-hop nodes of the first ingress node of the P2MP LSP and/or a backup P2MP LSP sub-tree from the previous-hop of an egress node to a second backup egress node may require fewer network resources, e.g. in terms of reserved bandwidth, than creating a second backup P2MP LSP from the second ingress node to all the second egress nodes. Additionally, routing the traffic locally via the backup nodes and backup P2MP LSP sub-tree, in the case of node failure, may be faster and simpler to implement than routing traffic along the second backup P2MP LSP. Thus, when a failure occurs in the first egress node 221, the first external networks 240, the first ingress nodes 211, the second ingress nodes 212, and/or at least some of the internal nodes 230 may be unaware of the failure.

Figure 3:
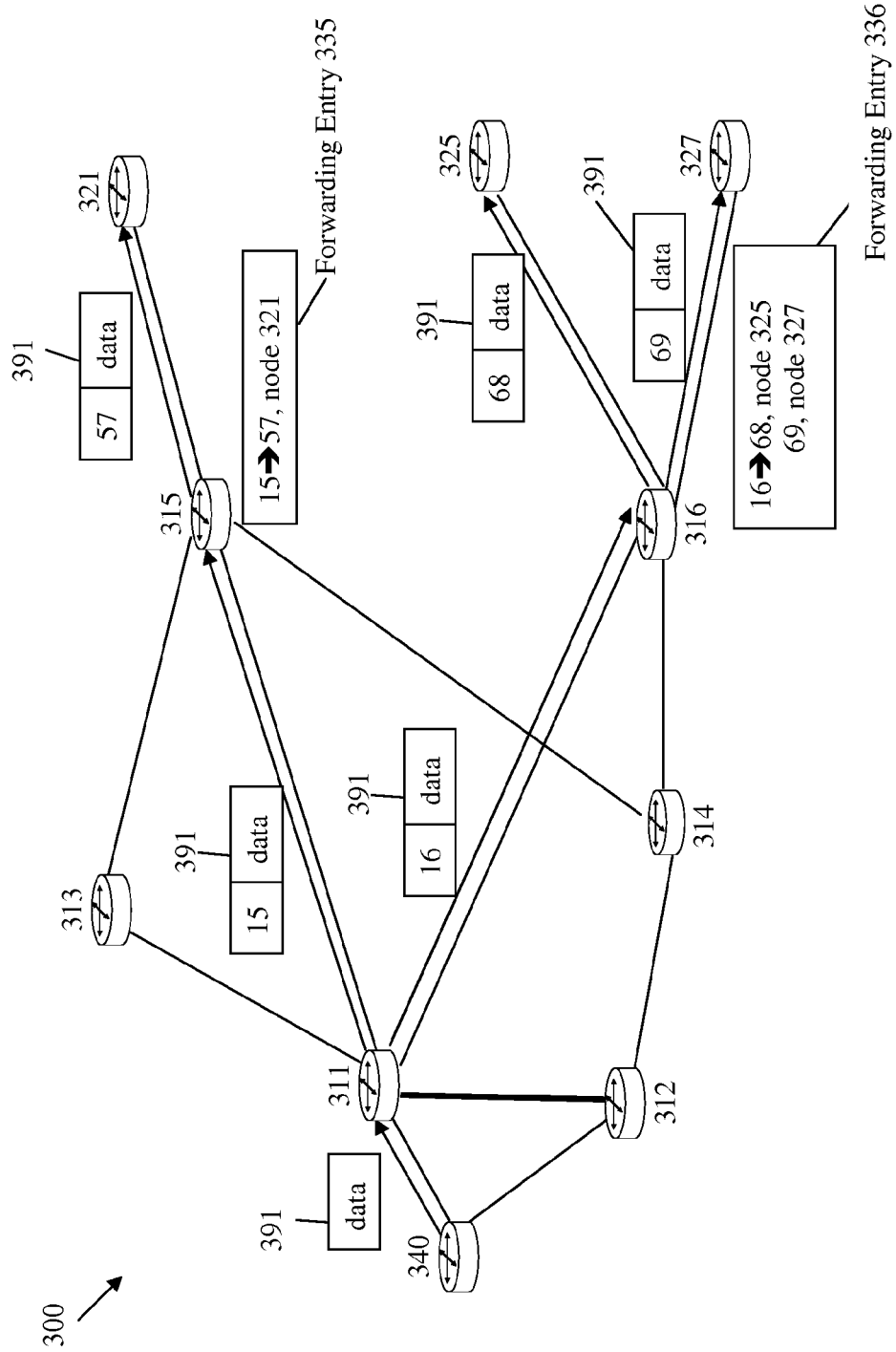
FIG. 3 is a schematic diagram of an embodiment of a P2MP LSP data forwarding scheme.

FIG. 3 illustrates one embodiment of a P2MP LSP data forwarding scheme 300, which may be used in a label switched system, e.g. the label switched system 200. The label switched system may comprise a first ingress node 311, a second ingress node 312, a plurality of internal nodes 313, 314, 315, and 316, and a plurality of egress nodes 321, 325, and 327. The first ingress node 311, the second ingress node 312, the egress nodes 321, 325, and 327 may be edge nodes in a label switched network, and the internal nodes 313, 314, 315, and 316 may be internal nodes in the label switched network. The label switched network may be used to transport multicast traffic from an external node 340, e.g. in an external network, to a plurality of clients or client networks (not shown).

The multicast traffic may be transported through the label switched network via an established P2MP LSP from the ingress node 311 to the egress nodes 321, 325, and 327 via the internal nodes 315 and 316. The ingress node 311 may receive a packet 391 that comprises data from the external node 340. The ingress node 311 may generate two copies of the packet 391 and add a label 15 to one of the copies and a label 16 to the other copy. The ingress node 311 may then forward the first packet 391 comprising the label 15 to the internal node 315 and a second packet 391 comprising the label 16 to the internal node 316. The internal node 315 may forward the received packet 391 using a forwarding entry 335. Specifically, the node 315 may replace the label 15 in the packet 391 with a new label 57, and send the packet 391 downstream to the node 321. The internal node 316 may forward the received packet 391 using a forwarding entry 336. The node 316 may generate two copies of the packet 391, replace the label 16 in each copy with new labels 68 and 69, and then send the two packets 391 downstream to the nodes 325 and 327. Specifically, the node 316 may replace the label 16 in a first copy of the packet 391 with a new label 68 and send the first copy to the node 325. The node 316 may also replace the label 16 in a second copy of the packet 391 with another new label 69 and send the second copy to the node 327.

FIG. 4 illustrates one embodiment of an ingress node protection scheme 400, which may be used in a label switched system, e.g. the label switched system 200. The label switched system may comprise a first ingress node 411, a second ingress node 412, a plurality of internal nodes 413, 414, 415, and 416, and a plurality of egress nodes 421, 425, and 427. The first ingress node 411, the second ingress node 412, and the egress nodes 421, 425, and 427 may be edge nodes in a label switched network, and the internal nodes 413, 414, 415, and 416 may be internal nodes in the label switched network. As in the schemes described above, the different nodes in the ingress node protection scheme 400 may communicate via links with one another. The label switched network may be used to transport multicast traffic from an external node 440 to a plurality of clients or client networks (not shown).

The multicast traffic may be transported through the label switched network via an established P2MP LSP, which may be configured substantially similar to the P2MP LSP in the schemes described above. Accordingly, the multicast traffic may be transported using a packet 491 and packet labeling. The second ingress node 412, which may be the backup ingress node, may establish a backup P2MP LSP sub-tree, which may extend from the backup ingress node to the next-hop nodes of the first ingress node 411. For example, the backup P2MP LSP sub-tree may extend from the second ingress node 412 to the internal nodes 415 and 416 of the first ingress node 411 via the internal node 414, which is a next-hop node of the second ingress node 412, as shown by the dotted arrow lines in FIG. 4.

When the second ingress node 412 detects a failure in the first ingress node 411, e.g. via a BFD interface 480 between the two ingress nodes, the second ingress node 412 may inform the external node 440. Alternatively, the external node 440 may detect the failure of the first ingress node 411 via a BFD interface between the external node 440 and the first ingress node 411, and send a packet that comprises the data to the second ingress node 412 instead of the first ingress node 411 when the failure is detected. Thus, the second ingress node 412 may receive a packet 492 that comprises data from the external node 440. The data may be the same as the data in the packet 491. The second ingress node 412 may then forward the packet 492 through the backup P2MP LSP sub-tree to deliver the packet 492 to the internal nodes 415 and 416 of the first ingress node 411 of the P2MP LSP. The second ingress node 412 may add a label 24 to the packet 492 that is allocated for the backup P2MP LSP sub-tree.

For example, the second ingress node 412 may send to the internal node 414 a packet 492 that comprises the data and a label 24. The label 24 may be allocated by the internal node 414 and sent to the second ingress node 412 for the backup P2MP LSP sub-tree. The internal node 414 may receive the packet 492, generate two copies of the packet 492, replace the label in each copy with a new label for the backup P2MP LSP sub-tree, and then send the packets 492 downstream. The internal node 414 may send a first copy of the packet 492 that comprises the data and a label 45 to the internal node 415, and may send another copy that comprises the same data and a label 46 to the internal node 416. Hence, the internal nodes 415 and 416 may receive their corresponding packets 492, which may comprise similar information. In addition, the backup P2MP LSP sub-tree is similar to a normal P2MP LSP comprising a plurality of source-to-leaf (S2L) sub LSPs, rather than a first P2P tunnel extending from the second ingress node 412 to the internal node 415 and a second P2P tunnel extending from the second ingress node 412 to the internal node 416.

The node 415 may forward the packet 492, which is received from the backup P2MP LSP sub-tree, to the node 421 using a forwarding entry 437. The node 415 may replace the label 45 in the packet 491 with a new label 57, and send the packet 491 downstream to the node 421. Similarly, the node 416 may forward the packet 492, which is received from the backup P2MP LSP sub-tree, to both of the nodes 425 and the node 427 using a forwarding entry 438. Specifically, the node 416 may generate two copies of the packet 492, replace the label in each copy with a new first label, and then send the packets 492 downstream to the node 425 and the node 427. For example, the node 416 may replace the label 46 in a first copy of the packet with a new label 68 and send the packet with the new label 68 downstream to the node 425. The node 416 may also replace the label 46 in a second copy of the packet with a new label 69 and send the packet with the new label 69 downstream to the node 427.

In a first configuration, the traffic may be delivered to the first ingress node 411, but not to the second ingress node 412 by the external node 440 in a normal case. When the node 440 detects a failure in the interface between the node 440 and the node 411, the node 440 sends the traffic to the second ingress node 412. The second ingress node 412 sends the traffic to the first ingress node 411, but not to the next hop nodes 415 and 416 of the ingress node 411 via the backup P2MP LSP sub-tree when the node 411 works normally. The traffic from the node 412 may be transported at the node 411 by the P2MP LSP. When the node 412 detects a failure in the node 411 by a mechanism such as a BFD session with the node 411, the node 412 sends the traffic from the node 440 to the next hop nodes 415 and 416 of the ingress node 411 via the backup P2MP LSP sub-tree. At such time, the second item of the forwarding entry 437 at node 415 and the second item of the forwarding entry 438 at node 416 may be active. The nodes 415 and 416 may not receive the traffic from the second ingress node 412 via the backup P2MP LSP sub-tree when the first ingress node 411 works normally. When a failure of the first ingress node 411 is detected by the second ingress node 412 via a BFD session with the first ingress node 411, the second ingress node 412 sends the traffic to the next hop nodes 415 and 416 of the first ingress node 411 via the backup P2MP LSP sub-tree. Thus, in the case of the failure of the first ingress node 411, the traffic from the backup P2MP LSP sub-tree may be forwarded downstream to the nodes 421 at node 415 by using the second item of the forwarding entry 437, and to the nodes 425 and 427 at node 416 by using the second item of the forwarding entry 438.

In a second configuration, the traffic may be delivered to the first ingress node 411 and the second ingress node 412 at the same time. The second ingress node 412 sends the traffic to the next hop nodes 415 and 416 of the ingress node 411 via the backup P2MP LSP sub-tree, and sends the traffic to the first ingress node 411. The traffic to the first ingress node 411 from the second ingress node 412 may be dropped by the first ingress node 411 when the node 411 receives the traffic from the external source node 440 via the interface between the node 411 and the node 440. The traffic to the first ingress node 411 from the second ingress node 412 may be transported by the first ingress node 411 via the P2MP LSP when the node 411 detects a failure in the interface between the node 411 and the node 440 via a mechanism such as a BFD session. At such time, the second item of the forwarding entry 437 at node 415 and the second item of the forwarding entry 438 at node 416 may be inactive. Thus, the traffic from the backup P2MP LSP sub-tree may be dropped by the nodes 415 and 416 in a normal case. When a failure of the first ingress node 411 is detected by the node 415 and the node 416 via a BFD session with the first ingress node 411, the second items of the forwarding entries 437 and 438 may be set to be active by nodes 415 and 416, respectively. Thus, in the case of the failure of the first ingress node 411, the traffic from the backup P2MP LSP sub-tree may be forwarded downstream to the node 421 by node 415, and to the nodes 425 and 427 by node 416.

In a third configuration, the traffic may be delivered to the first ingress node 411 and the second ingress node 412 at the same time. The second ingress node 412 sends the traffic to the first ingress node 411, but does not send the traffic to the next hop nodes 415 and 416 of the first ingress node 411 when the node 411 works normally. The traffic to the first ingress node 411 from the second ingress node 412 may be dropped by the first ingress node 411 when the node 411 receives the traffic from the external source node 440 via the interface between the node 411 and node 440. The traffic to the first ingress node 411 from the second ingress node 412 may be transported by the first ingress node 411 via the P2MP LSP when the node 411 detects a failure in the interface between the node 411 and the node 440 via a mechanism such as a BFD session. At such time, the second item of the forwarding entry 437 at node 415 and the second item of the forwarding entry 438 at node 416 may be active. The nodes 415 and 416 may not receive the traffic from the second ingress node 412 via the backup P2MP LSP sub-tree when the first ingress node 411 works normally. When a failure of the first ingress node 411 is detected by the second ingress node 412 via a BFD session with the first ingress node 411, the second ingress node 412 sends the traffic to the next hop nodes 415 and 416 of the first ingress node 411 via the backup P2MP LSP sub-tree. Thus, in the case of the failure of the first ingress node 411, the traffic from the backup P2MP LSP sub-tree may be forwarded downstream to the nodes 421 at node 415 by using the second item of the forwarding entry 437, and to the nodes 425 and 427 at node 416 by using the second item of the forwarding entry 438.

Figure 5:
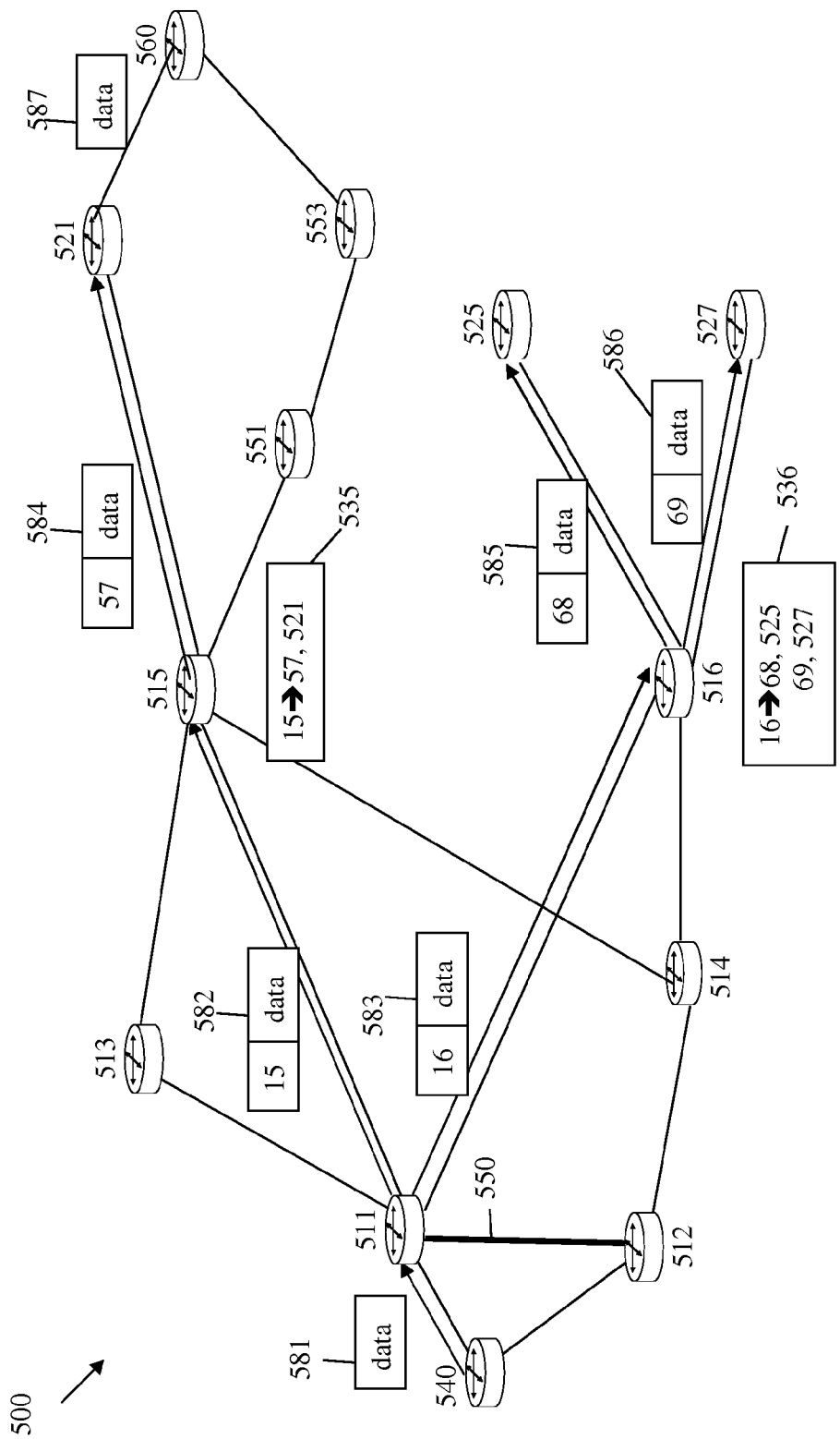
FIG. 5 is a schematic diagram of another embodiment of a P2MP LSP data forwarding scheme.

FIG. 5 illustrates one embodiment of a P2MP LSP data forwarding scheme 500, which may be used in a label switched system, e.g. the label switched system 200. The label switched system may comprise a first ingress node 511, a second ingress node 512, a plurality of internal nodes 513, 514, 515, 516 and 551, and a plurality of egress nodes 521, 525, 527 and 553. The first ingress node 511, the second ingress node 512, and the egress nodes 521, 525, 527, and 553 may be edge nodes in a label switched network, and the internal nodes 513, 514, 515, 516, and 551 may be internal nodes in the label switched network. The label switched network may be used to transport multicast traffic from an external node 540 to a plurality of clients or client networks including a node 560 (other clients are not shown).

The multicast traffic may be transported through the label switched network via an established P2MP LSP from the first ingress node 511 to the destination nodes 521, 525 and 527 via the internal nodes 515 and 516. The first ingress node 511 may receive a packet 581 that comprises data from the external node 540. The first ingress node 511 may generate two copies of the packet 581, add a label 15 to a first copy and another label 16 to a second copy, and thus obtain two new packets 582 and 583, respectively. The first ingress node 511 may forward the packet 582 with label 15 and the packet 583 with label 16 to the internal next hop nodes 515 and 516 of the first ingress node 511, respectively. The node 515 may forward the packet 583, which is received from the first ingress node 511, using a forwarding entry 535. Specifically, the node 515 may replace the label 15 in the packet 582 with a new label 57 to obtain a new packet 584 and send the packet 584 downstream to the node 521. The node 516 may forward the packet 583, which is received from the first ingress node 511, using a forwarding entry 536. The node 516 may generate two copies of the packet 583, replace the label in each copy with new label 68 and 69 to obtain two new packets 585 and 586, respectively, and then send the packets 585 and 586 downstream to the nodes 525 and 527, respectively. The node 521 may pop the label 57 in the received packet 584 to obtain a new packet 587 and then send the packet 587 to the external client 560, e.g. according to a destination IP address in the packet 587.

FIG. 6 illustrates one embodiment of an egress node protection scheme 600, which may be used in a label switched system, e.g. the label switched system 200. The label switched system may comprise a first ingress node 611, a second ingress node 612, a plurality of internal nodes 613, 614, 615, 616 and 651, and a plurality of egress nodes 621, 625, 627 and 653. The first ingress node 611, the second ingress node 612, and the egress nodes 621, 625, 627, and 653 may be edge nodes in a label switched network, and the internal nodes 613, 614, 615, 616, and 651 may be internal nodes in the label switched network. The label switched network may be used to transport multicast traffic from an external node 640 to a plurality of clients or client networks including a node 660 (other clients are not shown).

The multicast traffic may be transported through the label switched network via an established P2MP LSP, which may be configured substantially similar to the P2MP LSP in the schemes above. Accordingly, the multicast traffic may be transported using a packet 681 and packet labeling. The previous-hop node of the egress node 621 (e.g. internal node 615) may establish a backup P2MP sub-LSP from the previous-hop node to the backup egress node 653. The backup P2MP sub-LSP from the previous-hop node to the backup egress node 653 via the internal node 651, which is a next-hop node of the internal node 615, is shown by the dotted arrow lines in FIG. 6. The forwarding state for the backup P2MP sub-LSP is created or updated at the nodes 615, 651 and 653 accordingly. On the node 615, the forwarding entry 635 may comprise an active item used for forwarding a data packet with label 15 to the internal node 621 by replacing label 15 with label 57. The forwarding entry 635 may also comprise an inactive item that may be used for forwarding a data packet with label 15 to the internal node 651 by replacing label 15 with label 51. The inactive item may be used by setting the inactive item to active status when the node 615 detects a failure on the egress node 621.

When the previous-hop node 615 of the egress node 621 detects a failure in the egress node 621, e.g. via a BFD interface 680 between the node 615 and the egress node 621, the node 615 may set the corresponding inactive item in the forwarding entry 635 to active status. Thus, the node 615 may forward the data in the packet 682 with label 15 from the node 611 to the node 651 along the backup P2MP sub-LSP. The label 15 in the packet 682 may be replaced with a new label 51 to obtain a new packet 696 with label 51. The packet 696 may be forwarded to the node 651. The node 651 may forward the data in the packet 696 to the backup egress node 653 using the forwarding entry 639. The label 51 in the packet 696 may be replaced with a new label 13 to obtain a new packet 697 with label 13. The packet 697 may be forwarded to the backup egress node 653. The backup egress node 653 may send the data to the client 660 by removing the label 13 in the packet 697 and using the destination IP address in the data packet. While the backup P2MP sub-LSP does not branch (e.g. it appears to be a P2P sub-LSP), it is a S2L sub LSP to the backup egress node via the previous hop node of the egress node.

Figure 7:
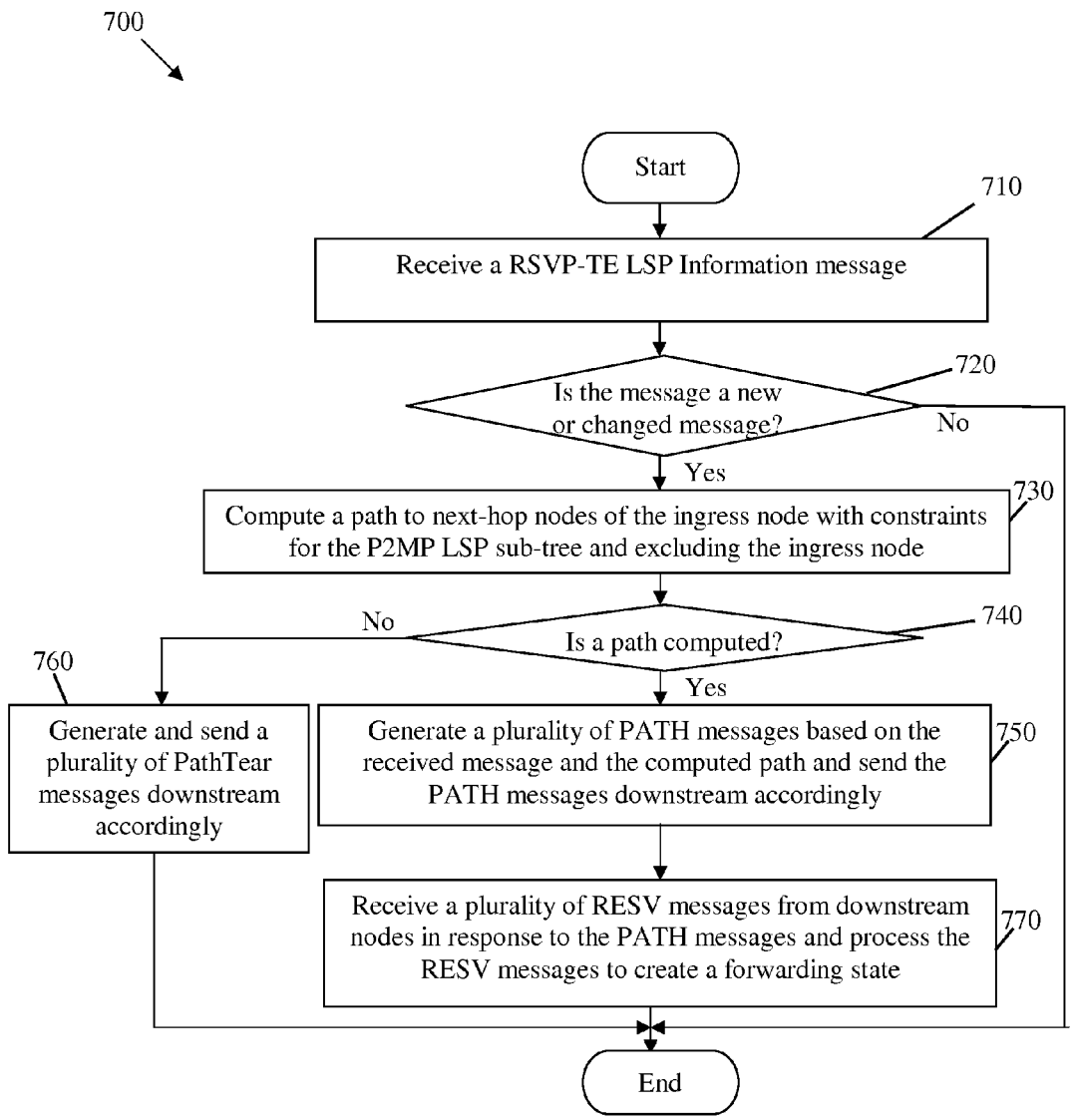
FIG. 7 is a flowchart of an embodiment of a backup P2MP LSP sub-tree creation method.

FIG. 7 illustrates one embodiment of a backup P2MP LSP sub-tree creation method 700. The backup P2MP LSP sub-tree creation method 700 may be used to create a backup P2MP LSP sub-tree from a backup ingress node to a plurality of next-hop nodes of an ingress node of the P2MP LSP in a label switched system, such as the label switched system 200. The method 700 may begin at block 710, where a Resource Reservation (RSVP) LSP information message may be received. The Resource Reservation Protocol (RSVP) LSP information message may be received from the ingress node of the P2MP LSP and comprise information about the P2MP LSP. At block 720, the method 700 may determine whether the message is a new or changed message. The information about the P2MP LSP in the message may be checked to determine whether the message is a new message for the P2MP LSP or the information in the message is changed compared with the information in a previously received message about the P2MP LSP. If the message is a new message or the information in the message is changed, then the method 700 may proceed to block 730. Otherwise, the method 700 may end.

At block 730, a path to the next-hop nodes of the ingress node may be computed with constraints for the P2MP LSP sub-tree and excluding the ingress node. The computed path may satisfy the constraints for the P2MP LSP sub-tree and may not include the ingress node. At block 740, the method 700 may determine whether a path is computed. If a path is computed, then the method 700 may proceed to block 750. Otherwise, the method 700 may proceed to block 760. At block 760, a plurality of PathTear messages may be generated and sent downstream accordingly. The PathTear messages may be used to tear down a backup P2MP LSP sub-tree that was created based the previously received information message for the P2MP LSP. The method 700 may then end. At block 750, a plurality of PATH messages may be generated based on the received information message and the computed path and the PATH messages may be sent downstream accordingly. At block 770, a plurality of RESV messages from downstream nodes may be received in response to the PATH messages and the RESV messages may be processed to create a forwarding state, e.g. based on the information in the RESV messages. The method 700 may then end.

In one embodiment, constructing a PATH message based on an P2MP LSP information message and a computed path at block 750 may comprise constructing a common header and a first plurality of objects, a second plurality of objects, and a third plurality of objects. The first objects may include a SESSION object, a SESSION_ATTRIBUTE object, and a TIME_VALUES object. The second objects may include a RSVP_HOP object and a RECORD_ROUTE object. The third objects may include a SENDER_TEMPLATE object, an EXPLICIT_ROUTE object, and objects in an source-to-leaf (S2L) sub-LSP descriptor list for the PATH message. Some of the objects in the PATH message are described in more detail below.

The common header of the PATH message may be constructed by setting a version (Vers) field, a Flags field, and a Reserved field in the common header of the PATH message to the corresponding values of a Vers field, a Flags field, and a Reserved field in a common header of the received P2MP LSP information message. Other fields, such as a message (Msg) Type field, a RSVP Checksum field, a send time to live (Send_TTL) field, and a RSVP Length field may be set similar to or as in the case of a standard PATH message.

The first objects of the PATH message may be constructed by copying the corresponding objects from the P2MP LSP information message. The second objects may be constructed similar to or as in the case of a standard PATH message. The SENDER_TEMPLATE object may be constructed by setting a tunnel sender address field, a first Reserved field, and an LSP identifier (ID) field in the object to the corresponding values of a tunnel sender address field, a first Reserved field, and an LSP ID field in a SENDER_TEMPLATE object in the received P2MP LSP information message. Configuring the SENDER_TEMPLATE may also include setting a Sub-Group Originator ID field to a TE Router ID of the backup ingress node, and setting a second Reserved field and a Sub-Group ID similar to or as in the case of a standard PATH message.

The EXPLICIT_ROUTE object and the objects in the S2L sub-LSP descriptor list of the PATH message may be constructed by combining the path computed to the next-hop nodes of the ingress node and the path from the next-hop nodes to the destination nodes. The path from the next-hop nodes to the destination nodes may be obtained from a RECORD_ROUTE object and a plurality of objects for an S2L sub-LSP flow descriptor list in the P2MP LSP information message. Alternatively, a plurality of internal nodes and links in a path from a next-hop node of the ingress node to a destination node may be removed, and thus the path from the next-hop node to that destination may be represented by the destination node.

Figure 8:
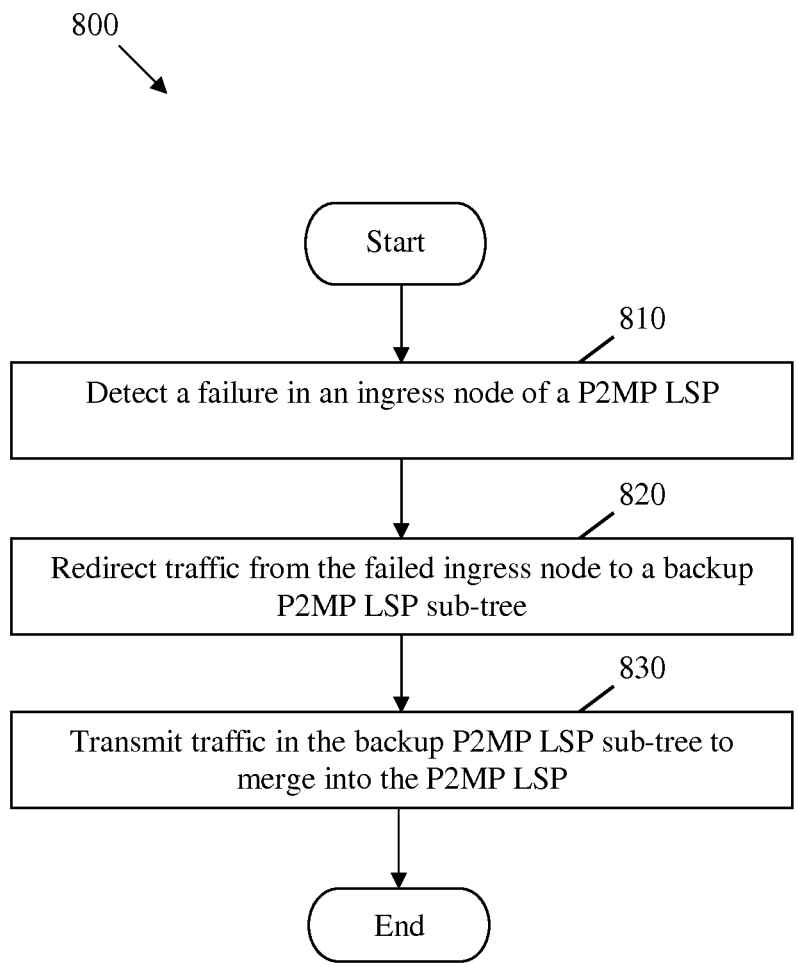
FIG. 8 is a flowchart of an embodiment of a backup ingress node routing method.

FIG. 8 illustrates an embodiment of a backup ingress node routing method 800. The backup ingress node routing method 800 may be used to direct traffic when an ingress node fails in a label switched system, such as the label switched system 200. The method 800 may begin at block 810, where a failure of the ingress node of a P2MP LSP may be detected. The ingress node may belong to a P2MP LSP in the label switched system, which may be used to multicast traffic from a provider to a plurality of clients. For instance, a backup ingress node that may be assigned to protect the ingress node may detect the failure of the ingress node via a BFD interface with the ingress node. At block 820, traffic may be redirected from the failed ingress node to a backup P2MP LSP sub-tree. For instance, the backup ingress node may inform the provider of the failure of the ingress node and as such the provider sends the traffic to the backup ingress node instead of the ingress node. At block 830, the traffic may be transmitted in the backup P2MP LSP sub-tree to merge into the P2MP LSP. For example, the traffic may be transmitted from the backup ingress node to a plurality of next-hop nodes of the ingress node of the P2MP LSP. When the traffic merges into the P2MP LSP, normal operations may be resumed to multicast the traffic to the clients. The method 800 may then end.

Figure 9:
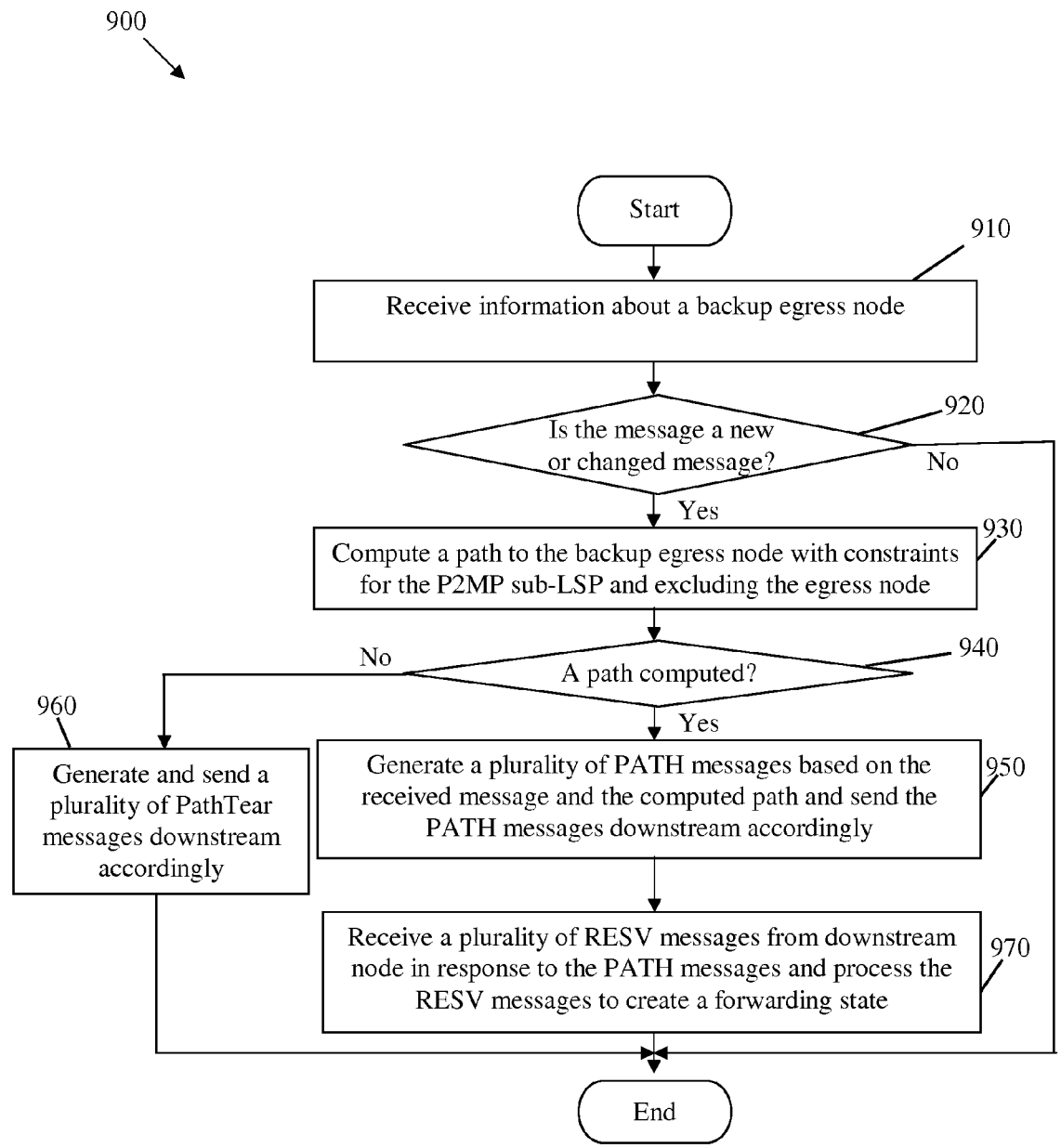
FIG. 9 is a flowchart of an embodiment of a backup P2MP sub-LSP creation method.

FIG. 9 is illustrates one embodiment of a backup P2MP sub-LSP creation method 900. The backup P2MP sub-LSP creation method 900 may be used to create a backup P2MP sub-LSP from a previous-hop node of an egress node of a P2MP LSP to a backup egress node in a label switched system, such as the label switched system 200. The method 900 may begin at block 910, where information about a backup egress node may be received. The information about the backup egress node may be received at the previous-hop node. At block 920, the method 900 may determine whether the message is a new or changed message. The information about the backup egress node may be checked to determine whether the information is new information or is changed compared with previously received information received. If the received information is new or changed, then the method 900 may proceed to block 930. Otherwise, the method 900 may end.

At block 930, a path to the backup egress node may be computed with constraints for the P2MP sub-LSP and excluding the egress node. The computed path may satisfy the constraints for the P2MP sub-LSP and may not include the egress node. At block 940, the method 900 may determine whether a path is computed. If a path is computed, then the method 900 may proceed to block 950. Otherwise, the method 900 may proceed to block 960. At block 960, a plurality of PathTear messages may be generated and sent downstream accordingly. The PathTear messages may be used to tear down a backup P2MP sub-LSP that was created based the previously received information, e.g. about a backup egress node. The method 900 may then end. At block 950, a plurality of PATH messages may be generated based on the received information message and the computed path and the PATH messages may be sent downstream accordingly. At block 970, a plurality of RESV messages from downstream nodes may be received in response to the PATH messages and the RESV messages may be processed to create a forwarding state, e.g. based on the information in the RESV messages. The forwarding entry for forwarding data towards the backup egress node may be set to be inactive, e.g. as long as no failure of the corresponding egress is detected. The method 900 may then end. The PATH, RESV, and PathTear messages may be configured similar to or as in the case of a standard PATH message to the corresponding messages in IETF document RFC 4875, which is incorporated herein by reference.

Figure 10:
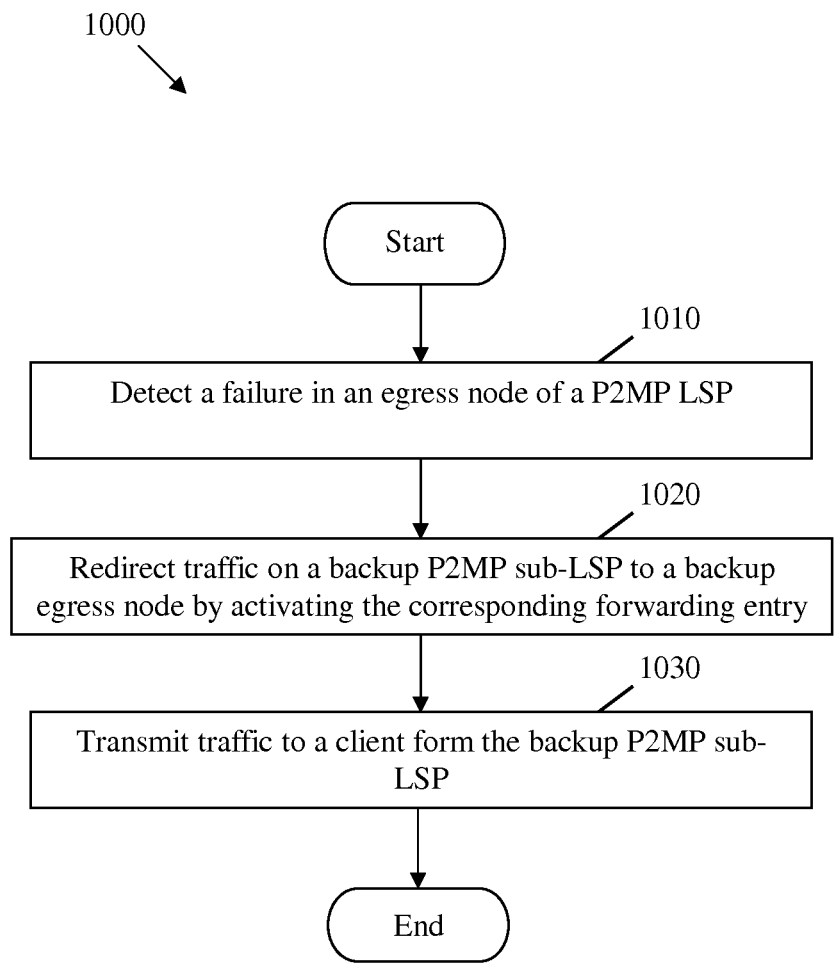
FIG. 10 is a flowchart of an embodiment of a backup egress node routing method.

FIG. 10 illustrates one embodiment of a backup egress node routing method 1000. The backup egress node routing method 1000 may be used to direct traffic when an egress node fails in a label switched system, such as the label switched system 200. The method 1000 may begin at block 1010, where a failure of the egress node of a P2MP LSP may be detected. The egress node may belong to a P2MP LSP in the label switched system, which may be used to multicast traffic from a provider to a plurality of clients. For instance, a backup egress node may be assigned to protect the egress node and a previous-hop node of the egress node may detect the failure of the egress node via a BFD interface with the egress node. At block 1020, traffic may be redirected on a backup P2MP sub-LSP to a backup egress node by activating the corresponding forwarding entry. The entry may be initially set to inactive when the P2MP sub-LSP was created, as described above. At block 1030, the traffic may be transmitted to a client node from the backup P2MP sub-LSP. The method 1000 may then end.

Figure 11:
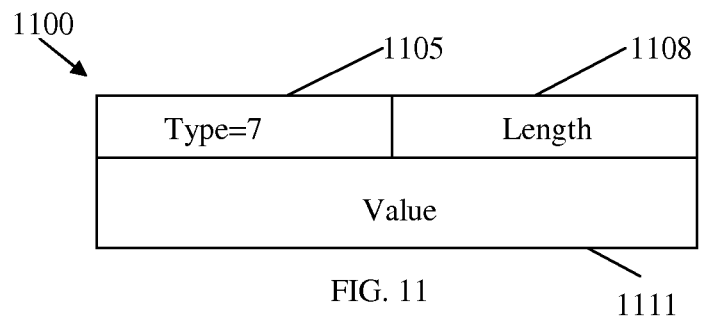
FIG. 11 is a schematic diagram of an embodiment of a LSP information Type-Length-Value (TLV).

FIG. 11 illustrates one embodiment of a LSP information TLV 1100, which may comprise information about a P2MP LSP. The LSP information TLV 1100 may be transported to a backup ingress node from an ingress node of the P2MP LSP in an OSPF type 9 LSA. The LSP information TLV 1100 may comprise a Type field 1105, a Length field 1108, and a Value field 1111. The Type field 1105 may be set to about seven or may be assigned by the Internet Assigned Numbers Authority (IANA). The Length field 1108 may indicate a length of the Value field 1111 in bytes. The Value field 1111 may comprise a set of sub-TLVs, including a LSP type sub-TLV, a P2MP LSP IPv4 identifier sub-TLV, a P2MP LSP IPv4 information sub-TLV, or combinations thereof.

Figure 12:
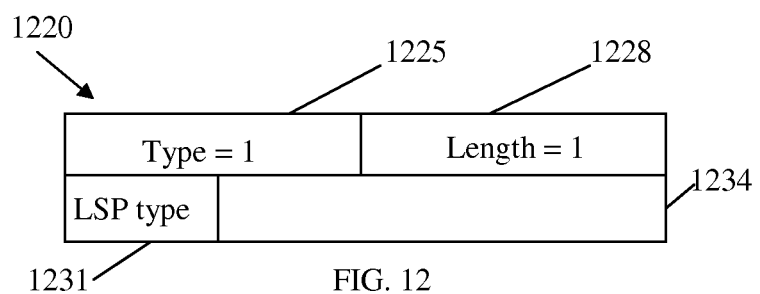
FIG. 12 is a schematic diagram of an embodiment of a LSP type sub-TLV.

FIG. 12 illustrates one embodiment of a LSP type sub-TLV 1220, which may define a type of a LSP. For instance, the LSP type sub-TLV 1220 may be part of the LSP information TLV 1100 and defines the type of the LSP associated with the LSP information TLV 1100. The LSP type sub-TLV 1220 may comprise a Type field 1225, a Length field 1228, a LSP type or Value field 1231, and padding 1234 if needed. The Type field 1225 may be set to about one or may be assigned by IANA. The Length field 1228 may indicate a length of about one byte. The Value field 1231 may be set to about one in the case of an IPv4 P2P LSP, about two in the case of an IPv4 P2MP LSP, about three in the case of an IPv6 P2P LSP, and about four in the case of an IPv6 P2MP LSP.

Figure 13:
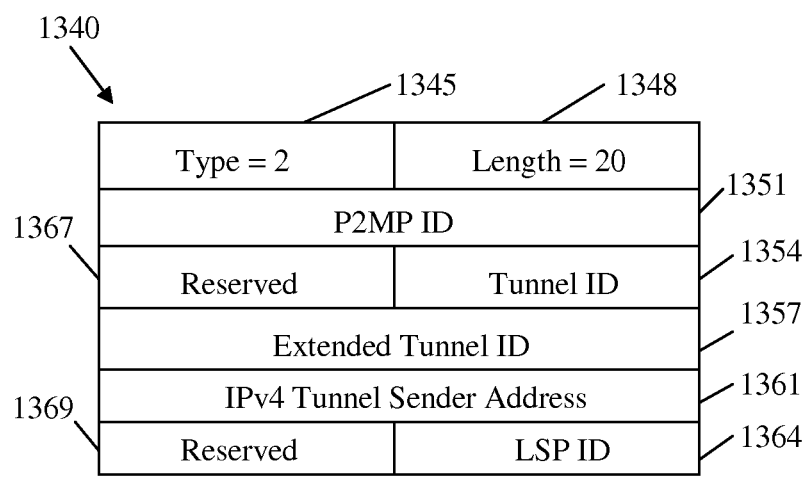
FIG. 13 is a schematic diagram of an embodiment of a P2MP LSP Internet Protocol (IP) version four (IPv4) identifier type sub-TLV.

FIG. 13 illustrates one embodiment of a P2MP LSP IPv4 identifier sub-TLV 1340, which may describe an identifier of an IPv4 P2MP LSP. The P2MP LSP IPv4 identifier sub-TLV 1340 may be part of the LSP information TLV 1100 and may comprise a Type field 1345, a Length field 1348, a P2MP ID 1351, a first Reserved field 1367, a Tunnel ID 1354, an Extended Tunnel ID 1357, an IPv4 Tunnel Sender Address 1361, a LSP ID 1364, and a second Reserved field 1369. The Type field 1345 may be set to about two or may be assigned by IANA. The Length field 1348 may indicate a length of about 20 bytes. The P2MP ID 1351, the Tunnel ID 1354, the Extended Tunnel ID 1357, and the first Reserved field 1367 may be configured similar to or as in a P2MP LSP Tunnel IPv4 SESSION Object defined in RFC 4875. The IPv4 Tunnel Sender Address 1361, the LSP ID 1364, and the second Reserved field 1369 may be configured similar to or as in a P2MP LSP Tunnel IPv4 SENDER_TEMPLATE Object defined in RFC 4875.

Figure 14:
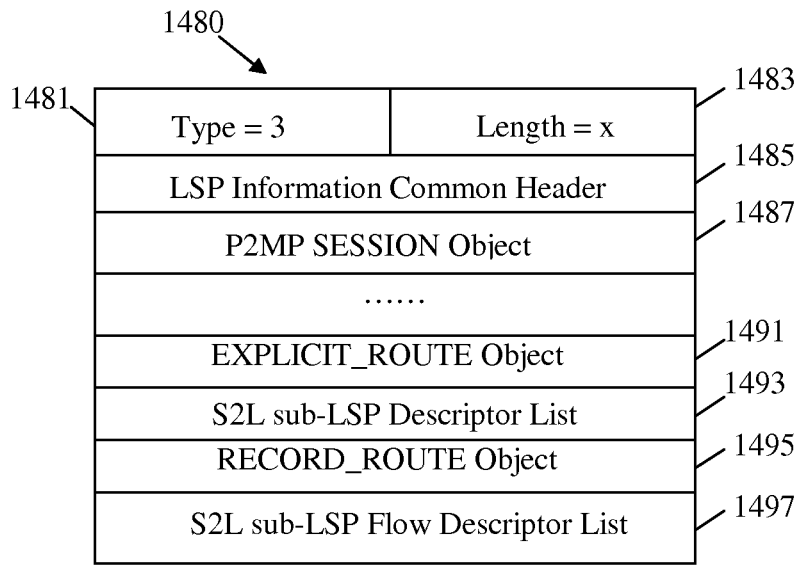
FIG. 14 is a schematic diagram of an embodiment of a P2MP LSP IPv4 information sub-TLV.

FIG. 14 illustrates one embodiment of a format of a P2MP LSP IPv4 information sub-TLV 1480, which may describe information about a P2MP LSP. The P2MP LSP IPv4 information sub-TLV 1480 may be part of the LSP information TLV 1100 and may comprise a Type field 1481, a Length field 1483, an LSP Information Common Header 1485, a P2MP SESSION Object 1487, an EXPLICIT_ROUTE Object 1491, a S2L sub-LSP Descriptor List 1493, a RECORD_ROUTE Object 1495, and a S2L sub-LSP Flow Descriptor List 1497. The fields 1485 to 1497 may form a Value field for the P2MP LSP IPv4 information sub-TLV 1480. The Type field 1481 may be set to about three or may be assigned by IANA. The Length field 1483 may vary depending on the Value field (e.g. the fields 1485 to 1497). The LSP Information Common Header 1485 is described below. The P2MP SESSION Object 1487, the EXPLICIT_ROUTE Object 1491, and the S2L sub-LSP Descriptor List 1493 may be configured similar to as in a P2MP LSP Tunnel IPv4 SESSION Object, an EXPLICIT_ROUTE Object, and an S2L sub-LSP Descriptor List defined in RFC 4875, respectively. The RECORD_ROUTE object 1495 and the S2L sub-LSP flow descriptor list 1497 may comprise the path traversed by the P2MP LSP, which may be obtained from a RSVP-TE RESV message that the ingress node of the P2MP LSP receives.

In other embodiments, the LSP information TLV 1100 may not comprise a LSP type sub-TLV 1220 and/or P2MP LSP IPv4 identifier sub-TLV 1340. Instead, the information in the LSP type sub-TLV 1220 and the P2MP LSP IPv4 identifier sub-TLV 1340 may be derived from a SESSION object and a P2MP LSP SENDER_TEMPLATE object in a P2MP LSP information sub-TLV (e.g. the P2MP LSP IPv4 Information sub-TLV 1480) in the LSP Information TLV 1100. In this case, the LSP information TLV 1100 may be more compact. However, the OSPF may need to decode the SESSION object and the SENDER_TEMPLATE object inside the P2MP LSP information sub-TLV to get an identifier for a LSP to store the information for each different LSP.

Figure 15:
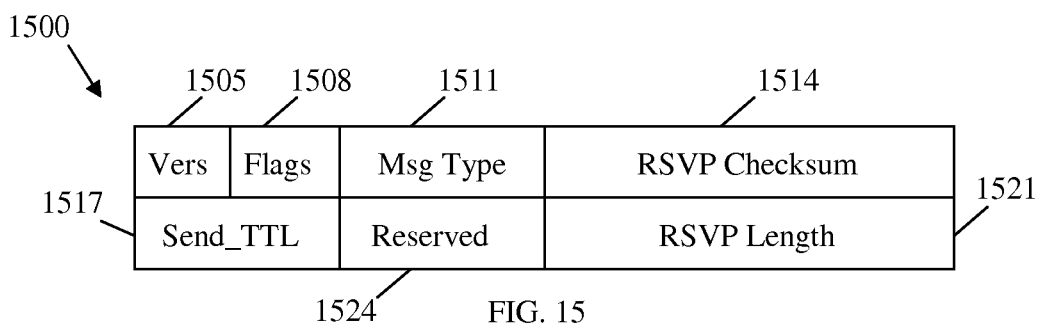
FIG. 15 is a schematic diagram of an embodiment of a LSP information common header.

FIG. 15 illustrates one embodiment of a format of an LSP Information Common Header 1500. The LSP Information Common Header 1500 may correspond to the LSP Information Common Header 1485 in the P2MP LSP IPv4 Information sub-TLV 1480. The LSP Information Common Header 1500 may comprise a Vers field 1505, a Flags field 1508, a Msg Type field 1511, a RSVP Checksum field 1514, a Send_TTL field 1517, a RSVP Length field 1521, and a Reserved field 1524. The values in these fields associated with a P2MP LSP may be configured similar to the values in the corresponding fields in a RSVP-TE message that the ingress node of the P2MP LSP sends downstream to its next-hop nodes. The RSVP Checksum field 1514 and RSVP Length field 1521 in the LSP Information Common Header 1500 may be set according to the contents of the objects following the LSP Information Common Header 1500 in the P2MP LSP IPv4 Information sub-TLV 1480. The value of the Msg Type field 1511 may be ignored.

In other embodiments, a common header in a P2MP LSP information sub-TLV may not comprise a Msg Type field, a Send_TTL field, a RSVP Checksum field, and/or a RSVP Length field. Alternatively, the values of these fields may be ignored if the common header in a P2MP LSP information sub-TLV contains these fields.

Figure 16:
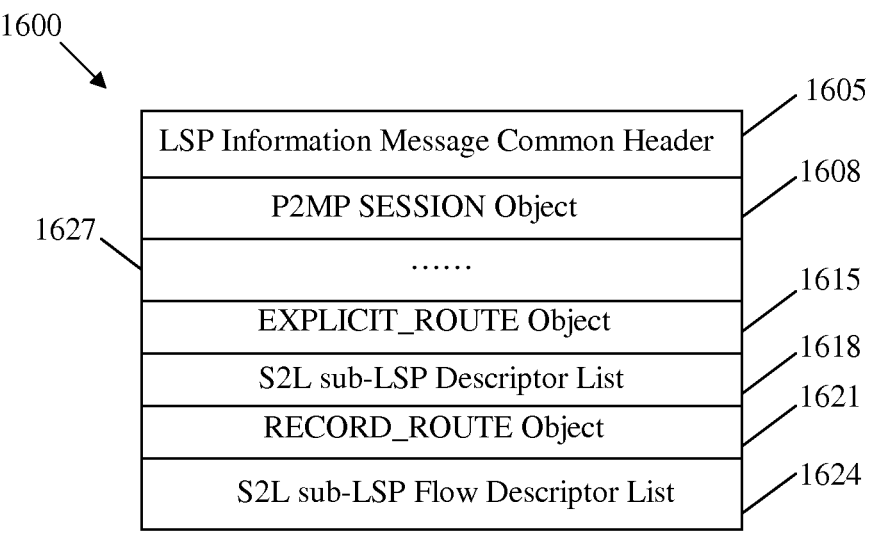
FIG. 16 is a schematic diagram of an embodiment of a LSP information message.

FIG. 16 illustrates one embodiment of a LSP information message 1600 for a P2MP LSP. The LSP information message 1600 may be a RSVP-TE message that comprises a LSP Information message common header 1605 and a plurality of objects. The objects may comprise a P2MP SESSION object 1608, an EXPLICIT_ROUTE object 1615, a S2L sub-LSP descriptor list 1618, a RECORD_ROUTE object 1621, a S2L sub-LSP flow descriptor list 1624, and optionally other objects 1627. The formats and values of the objects 1608, 1615, and 1618 may be configured similar to or as in the corresponding objects defined in RFC 4875. The format of the objects 1621 and 1624 may be configured similar to or as in the objects defined in RFC 4875. The values of the objects 1621 and 1624 may describe the path traversed by the P2MP LSP, which may be obtained from a RECORD_ROUTE object and a S2L sub-LSP flow descriptor list in a RSVP-TE RESV message that an ingress node of the P2MP LSP receives.

Figure 17:
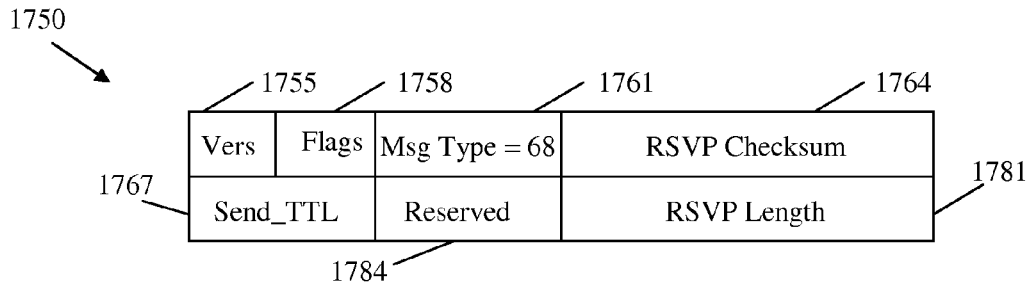
FIG. 17 is a schematic diagram of an embodiment of a LSP information message common header.

FIG. 17 illustrates one embodiment of a LSP information message common header 1750, which may be part of the LSP information message 1600 for a P2MP LSP. The LSP information message common header 1750 may comprise a Vers field 1755, a Flags field 1758, a Msg Type field 1761, a RSVP Checksum field 1764, a Send_TTL field 1767, a Reserved field 1784, and a RSVP Length field 1781. The Msg Type field 1761 may be set to about 68 or may be assigned by IANA. The values of the other fields in the LSP information message common header 1750 may be configured similar to or as in a common header in an existing RSVP-TE message, such as a PATH message that an ingress node of the P2MP LSP sends to the next-hop nodes of the ingress node.

In one embodiment, an ingress node of a P2MP LSP may send a RSVP-TE LSP Information message for the P2MP LSP to a backup ingress node of the P2MP LSP. Similar to sending an existing RSVP-TE message, such as a PATH message, the ingress node may send an updated RSVP-TE LSP Information message to the backup ingress node when there is a change in the RSVP-TE LSP Information message. The ingress node may send the same RSVP-TE LSP Information message to the backup ingress node every refresh interval if there is not any change in the RSVP-TE LSP Information message. When the backup ingress node receives the RSVP-TE LSP Information message from the ingress node, the backup ingress node may store the information about the P2MP LSP, construct a PATH message or a plurality of PATH messages according to the information about the P2MP LSP, and send the PATH messages downstream accordingly. If the backup ingress node does not receive any RSVP-TE LSP Information message for the P2MP LSP for a period, such as a cleanup timeout interval, the backup ingress node may remove the information about the P2MP LSP, construct a PathTear message or a plurality of PathTear messages, and send the PathTear messages downstream accordingly.

Figure 18:
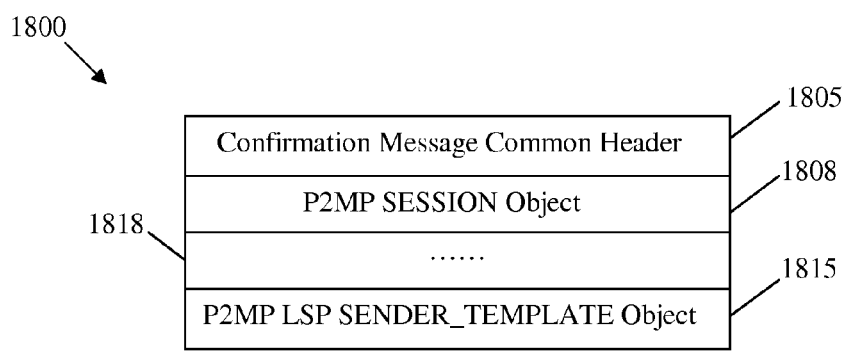
FIG. 18 is a schematic diagram of an embodiment of a LSP information confirmation message.

FIG. 18 illustrates one embodiment of a LSP information confirmation message 1800. The LSP information confirmation message 1800 may comprise a confirmation message common header 1805, a P2MP SESSION object 1808, a P2MP LSP SENDER_TEMPLATE object 1815, and optionally other objects 1818. The LSP information confirmation message 1800 may be used to confirm that a backup ingress node of a P2MP LSP has received a LSP information message about the P2MP LSP from an ingress node of the P2MP LSP. When the backup ingress node receives the LSP information message from the ingress node, the backup ingress node may construct and send to the ingress node a LSP information confirmation message for the LSP information message. The formats and values of the objects 1808, 1815, and 1818 may be configured similar to or as in the corresponding objects defined in RFC 4875.

Figure 19:
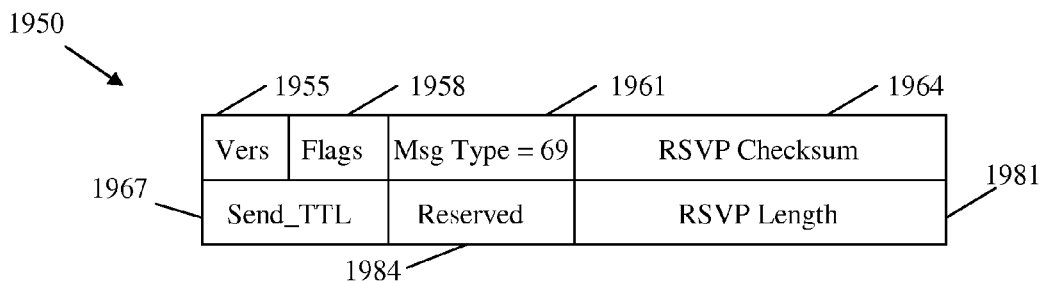
FIG. 19 is a schematic diagram of an embodiment of a LSP information confirmation message header.

FIG. 19 illustrates one embodiment of a LSP information confirmation message common header 1950, e.g. in the LSP information confirmation message 1800. The LSP information confirmation message common header 1950 may comprise a Vers field 1955, a Flags field 1958, an Msg Type field 1961, a RSVP Checksum field 1964, a Send_TTL field 1967, a RSVP Length field 1981, and a Reserved field 1984. The Msg Type field 1961 may be set to about 69 or may be assigned by IANA. The values of the fields 1955, 1958, and 1984 in the LSP information confirmation message common header 1950 may be configured similar to or as in a common header of an existing RSVP-TE message, such as a PATH message. The values of the fields 1964 and 1981 may be calculated according to the values of the objects subsequent to the common header.

In one embodiment, when a backup ingress node of a P2MP LSP receives a RSVP-TE LSP information message from an ingress node of the P2MP LSP, the backup ingress node may construct a RSVP-TE LSP information conformation message based on the RSVP-TE LSP Information message received, and send the conformation message to the ingress node. A P2MP SESSION object in the RSVP-TE LSP Information confirmation message may have about the same contents as a P2MP SESSION object in the RSVP-TE LSP Information message. A P2MP LSP SENDER_TEMPLATE object in the RSVP-TE LSP information confirmation message may have about the same contents as a P2MP LSP SENDER_TEMPLATE object in the RSVP-TE LSP information message. After the ingress node receives the RSVP-TE LSP information conformation message from the backup ingress node, the ingress node may stop sending the RSVP-TE LSP information message to the backup ingress node every refresh interval if there is not any change in the RSVP-TE LSP information message. In this case, the ingress node may send an updated RSVP-TE LSP Information message to the backup ingress node when there is a change in the RSVP-TE LSP Information message.

Figure 20:
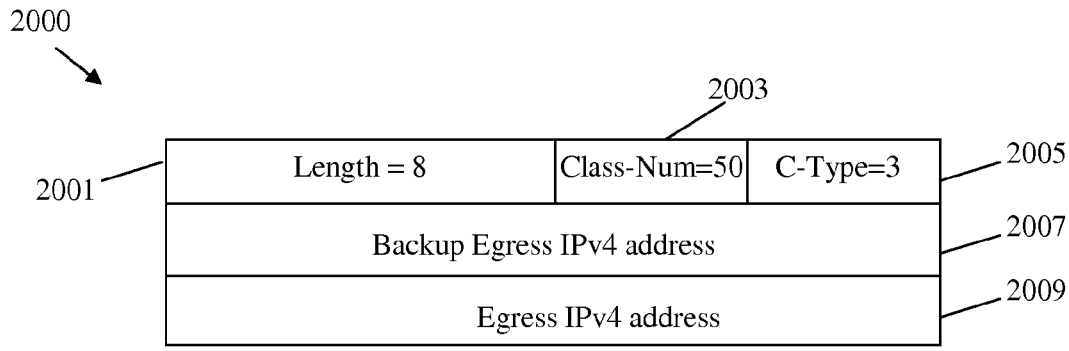
FIG. 20 is a schematic diagram of an embodiment of a backup egress S2L-SUB-LSP IPv4 object.

FIG. 20 illustrates one embodiment of a backup egress S2L-SUB-LSP IPv4 object 2000, which may comprise information about a backup egress node, e.g. an IPv4 Backup egress node, for a P2MP LSP. The backup egress S2L-SUB-LSP IPv4 object 2000 may comprise a Length field 2001, a Class Number (Class-Num) field 2003, a Class Type (C-Type) field 2005, a backup egress IPv4 address 2007, and an egress IPv4 address 2009. The Length field 2001 may indicate a length of about eight bytes. The Class Number field 2003 and the Class Type field 2005 may have values of about 50 and about 3, respectively, or may be assigned by IANA. The backup egress IPv4 address 2007 may comprise an IPv4 address for the backup egress node. The egress IPv4 address 2009 may comprise an IPv4 address for an egress node associated with the backup egress node. The backup egress S2L-SUB-LSP IPv4 object 2000 may be transported to a previous-hop node of an egress node from an ingress node of the LSP in a RSVP-TE PATH message.

Figure 21:
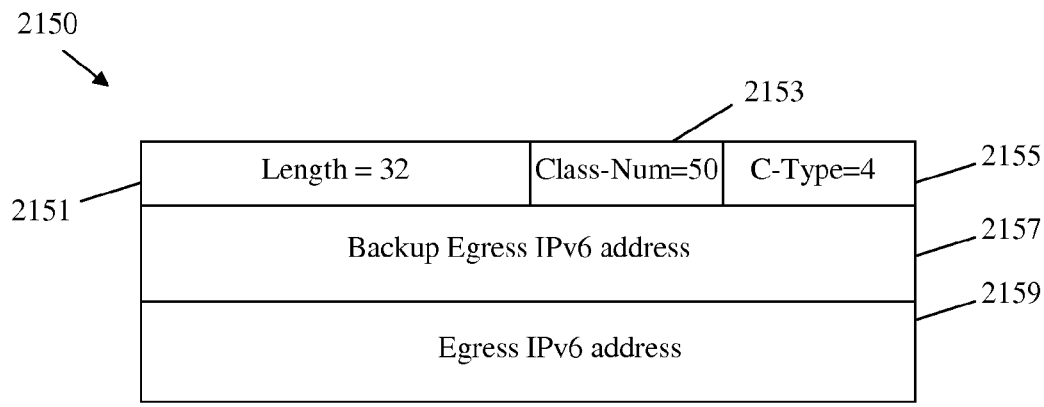
FIG. 21 is a schematic diagram of an embodiment of a backup egress S2L-SUB-LSP IP version six (IPv6) object.

FIG. 21 illustrates one embodiment of a backup egress S2L-SUB-LSP IPv6 object 2150, which may comprise information about an IPv6 backup egress, for example similar to the backup egress S2L-SUB-LSP IPv4 object 2000. The backup egress S2L-SUB-LSP IPv6 object 2150 may comprise a Length field 2151, a Class Number field 2153, a Class Type field 2155, a backup egress IPv6 address 2157, and an egress IPv6 address 2159. The Length field 2151 may indicate a length of about 32 bytes. The Class Number field 2153 and the Class Type field 2155 may have values of about 50 and 4, respectively, or may be assigned by IANA. The backup egress IPv6 address 2157 may comprise an IPv6 address for the backup egress node. The egress IPv6 address 2159 may comprise an IPv6 address for an egress node associated with the backup egress node. The backup egress S2L-SUB-LSP IPv6 object 2150 may be transported to a previous-hop node of an egress node from an ingress node of the LSP in a RSVP-TE PATH message.

Figure 22:
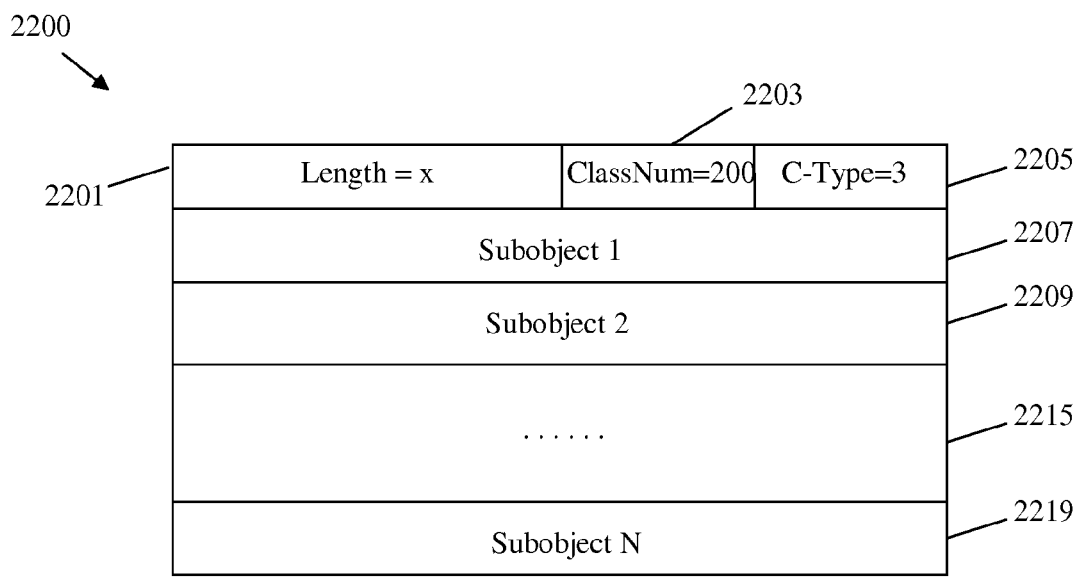
FIG. 22 is a schematic diagram of an embodiment of a backup egress SECONDARY-EXPLICIT-ROUTE object.

FIG. 22 illustrates one embodiment of a backup egress SECONDARY-EXPLICIT-ROUTE object 2200, which may comprise information about a path from a previous-hop node of an egress node to a backup egress node. The backup egress SECONDARY-EXPLICIT-ROUTE object 2200 may comprise a Length field 2201, a Class Number field 2203, a Class Type field 2205, and optionally a plurality of sub-objects 2207 to 2219 (labeled Subobject 1, Subobject 2 . . . Subobject N, where N is an integer). The Length field 2201 may vary depending on the quantity and content of the sub-objects. The Class Number field 2203 and the Class Type field 2205 may have values of about 200 and about 3, respectively, or may be assigned by IANA. The sub-objects 2207, 2209, 2215 . . . , and 2219 may have similar or same format as the sub-objects in an ERO defined in IETF document RFC 3209, which is incorporated herein by reference. The backup egress SECONDARY-EXPLICIT-ROUTE object 2200 may be transported to a previous-hop node of an egress node from an ingress node of the LSP in a RSVP-TE PATH message.

Figure 23:
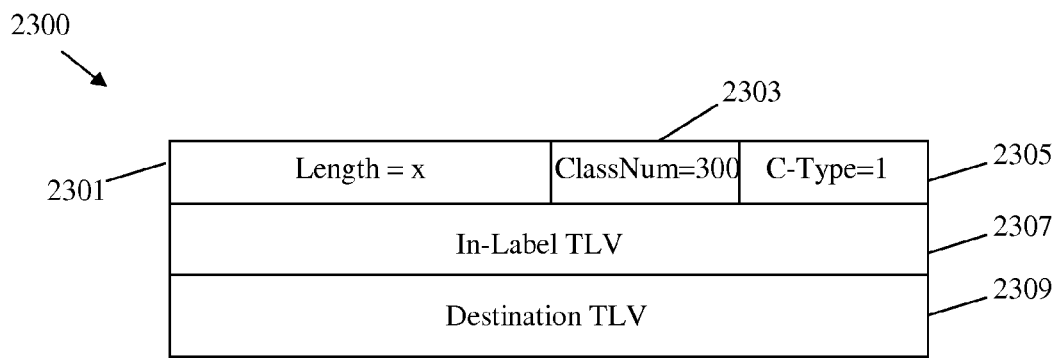
FIG. 23 is a schematic diagram of an embodiment of an egress FORWARDING object.

FIG. 23 illustrates one embodiment of an egress FORWARDING object 2300, which may comprise information about forwarding data received from a P2MP LSP to a client on the egress. The egress FORWARDING object 2300 may comprise a Length field 2301, a Class Number field 2303, a Class Type field 2305, an In-Label TLV 2307, and a Destination TLV 2309. The Length field 2301 may vary depending on the In-Label TLV 2307 and the Destination TLV 2309. The Class Number field 2303 and the Class Type field 2305 may have values of about 300 and about 1, respectively, or may be assigned by IANA. The In-Label TLV 2307 may comprise a label and the Destination TLV 2309 may comprise a destination address for a client. The egress FORWARDING object 2300 may be transported to a previous-hop node of an egress node from the egress node of the LSP in a RSVP-TE RESV message and then transported to a backup egress node from the previous-hop node via a RSVP-TE PATH message.

Figure 24:
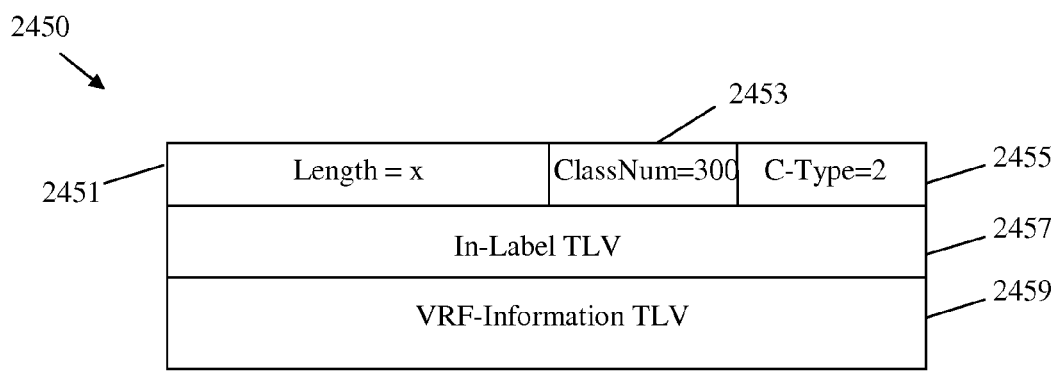
FIG. 24 is a schematic diagram of another embodiment of an egress FORWARDING object.

FIG. 24 illustrates another embodiment of an egress FORWARDING object 2450, which may comprise information about forwarding data received from a P2MP LSP to a client on the egress. The egress FORWARDING object 2450 may comprise a Length field 2451, a Class Number field 2453, a Class Type field 2455, an In-Label TLV 2457, and a VRF information TLV 2459. The Length field 2451 may vary depending on the In-Label TLV 2457 and the VRF information TLV 2459. The Class Number field 2453 and the Class Type field 2455 may have values of about 300 and about 2, respectively, or may be assigned by IANA. The In-Label TLV 2457 may comprise a label and the VRF information TLV 2459 may comprise information about VRF on the egress node. The egress FORWARDING object 2450 may be transported to a previous-hop node of an egress node from the egress node of the LSP in a RSVP-TE RESV message and then transported to a backup egress node from the previous-hop node via a RSVP-TE PATH message.

Figure 25:
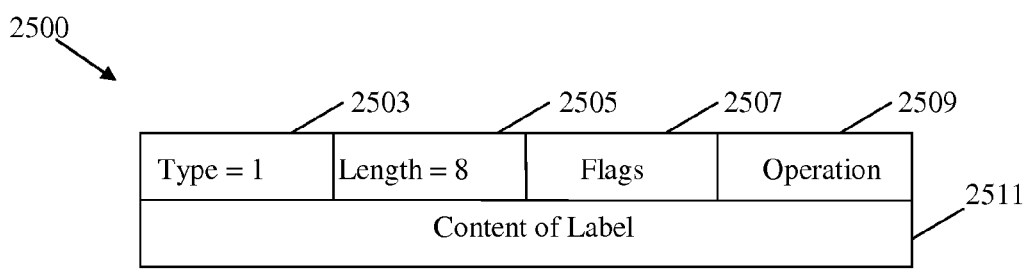
FIG. 25 is a schematic diagram of an embodiment of an In-Label TLV.

FIG. 25 illustrates one embodiment of an In-Label TLV 2500, which may comprise information about a label. The In-Label TLV 2500 may correspond to the In-Label TLV 2457 in the egress FORWARDING object 2450 and may comprise a Type field 2503, a Length field 2505, a Flags field 2507, an Operation field 2509, and a Content of Label field 2511. The Type field 2503 may be set to about one or may be assigned by IANA. The Length field 2505 may indicate a length of about eight bytes. The Flags field 2507 may be set to about one to indicate that the label in the In-Label TLV 2500 is a Global label. The Operation field 2509 may comprise a code for a label operation. For instance, the code 1 may be for a pop operation and 2 for a swap operation. The Content of Label field 2511 may comprise a label.

Figure 26:
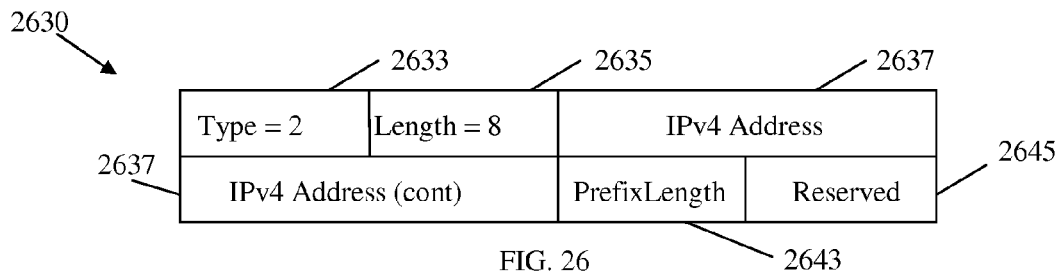
FIG. 26 is a schematic diagram of an embodiment of an IPv4 Destination TLV.

FIG. 26 illustrates one embodiment of an IPv4 Destination TLV 2630, which may indicate an IPv4 destination. The Destination TLV 2630 may correspond to the Destination TLV 2309 in the egress FORWARDING object 2300. The Destination TLV 2630 may comprise a Type field 2633, a Length field 2635, an IPv4 address 2637, a Prefix Length field 2643, and a Reserved field 2645. The Type field 2633 may be set to about two or may be assigned by IANA. The Length field 2635 may indicate a length of about eight bytes. The IPv4 address 2637 may comprise an IPv4 address. The Prefix Length field 2643 may indicate a length of the IPv4 address 2637 in bits. The Reserved field 2645 may be set to about zero and may not be used.

Figure 27:
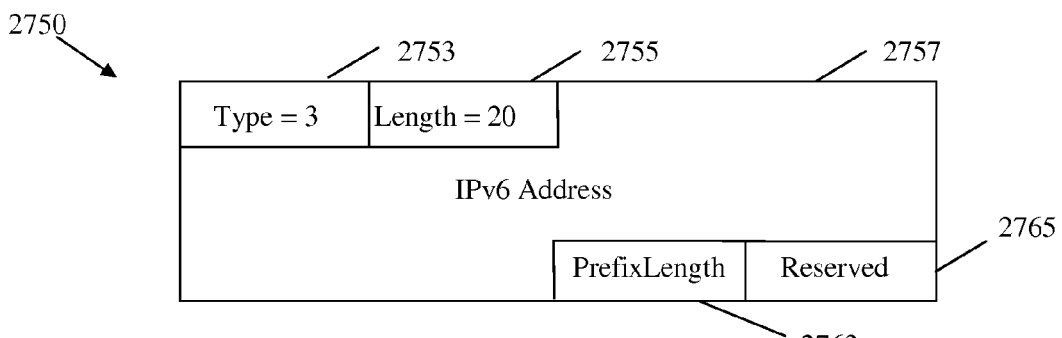
FIG. 27 is a schematic diagram of an embodiment of an IPv6 Destination TLV.

FIG. 27 illustrates of one embodiment of an IPv6 Destination TLV 2750, which may indicate an IPv6 destination. The IPv6 Destination TLV 2750 may correspond to the Destination TLV 2309 in the egress FORWARDING object 2300. The IPv6 Destination TLV 2750 may comprise a Type field 2753, a Length field 2755, an IPv6 address 2757, a Prefix Length field 2763, and a Reserved field 2765. The Type field 2753 may be set to about three or may be assigned by IANA. The Length field 2755 may indicate a length of about 20 bytes. The IPv6 address 2757 may comprise an IPv6 address. The Prefix Length field 2763 may indicate a length of the IPv6 address in bits. The value of the Reserved field 2765 may be set to about zero and may not be used.

Figure 28:
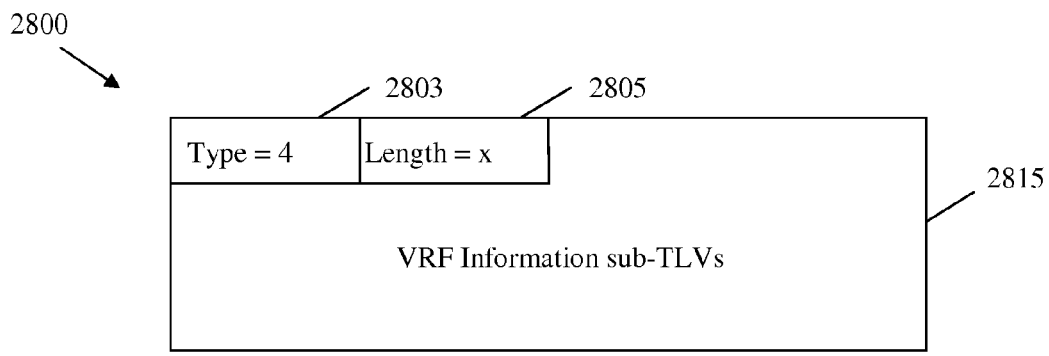
FIG. 28 is a schematic diagram of an embodiment of a Virtual Routing and Forwarding (VRF) information TLV.

FIG. 28 illustrates one embodiment of a VRF information TLV 2800, which may comprise information about a VRF. The VRF information TLV 2800 may correspond to the VRF information TLV 2459 in the egress FORWARDING object 2450. The VRF information TLV 2800 may comprise a Type field 2803, a Length field 2805, and a plurality of VRF Information sub-TLVs 2815. The Type field 2803 may be set to about four or may be assigned by IANA. The Length field 2805 may vary depending on the VRF Information sub-TLVs 2815. The VRF Information sub-TLVs 2815 may comprise a Route Distinguisher sub-TLV and/or a VRF name sub-TLV, as described below.

Figure 29:
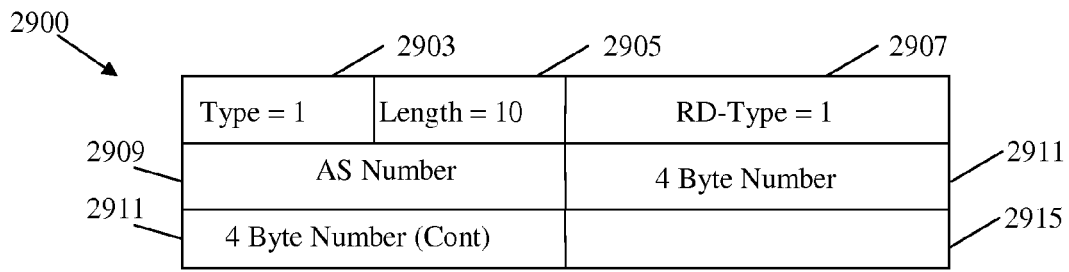
FIG. 29 is a schematic diagram of an embodiment of a Route Distinguisher sub-TLV.

FIG. 29 illustrates one embodiment of a Route Distinguisher sub-TLV 2900, which may describe a Route Distinguisher. The Route Distinguisher sub-TLV 2900 may be part of the VRF Information sub-TLVs 2815 in the VRF information TLV 2800. The Route Distinguisher sub-TLV 2900 may comprise a Type field 2903, a Length field 2905, a Route Distinguisher-Type (RD-Type) field 2907, an Autonomous System (AS) Number field 2909, a four-byte (4-Byte) Number field 2911, and a Reserved field 2915. The Type field 2903 may be set to about one or may be assigned by IANA. The Length field 2905 may indicate a length of about ten bytes. The RD-Type field 2907 may be set to about one to indicate that the Route Distinguisher consists of an AS number and a 4-byte administrator number. The AS Number field 2909 may comprise an AS number from about zero to about 65,535. The 4-Byte Number field 2911 may comprise a number from about 0 to about $2^{32}-1$. The Reserved field 2915 may be set to about zero and may not be used.

Figure 30:
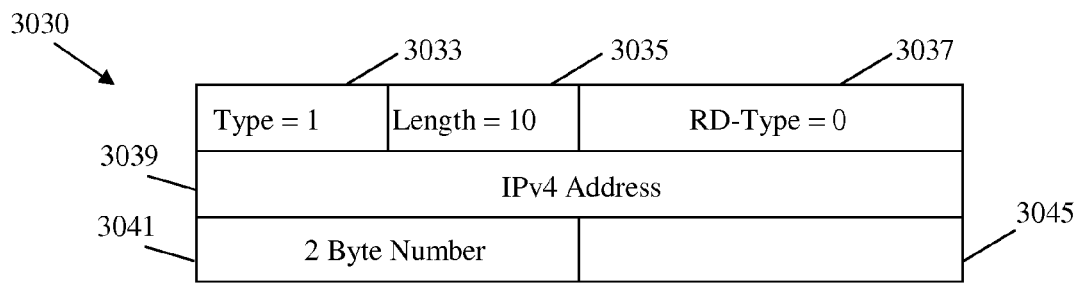
FIG. 30 is a schematic diagram of another embodiment of a Route Distinguisher sub-TLV.

FIG. 30 illustrates another embodiment of a format of a Route Distinguisher sub-TLV 3030, which may describe a Route Distinguisher. The Route Distinguisher sub-TLV 3030 may be part of the VRF Information sub-TLVs 2815 in the VRF information TLV 2800. The Route Distinguisher sub-TLV 3030 may comprise a Type field 3033, a Length field 3035, a RD-Type field 3037, an IPv4 address 3039, a two-byte (2-Byte) Number field 3041, and a Reserved field 3045. The Type field 3033 may be set to about one 1 or may be assigned by IANA. The Length field 3035 may indicate a length of about ten bytes. The RD-Type field 3037 may be set to about zero to indicate that the Route Distinguisher consists of an IPv4 address and a 2-byte administrator number. The IPv4 address 3039 may comprise an IPv4 address. The 2-Byte Number field 3041 may comprise a number from about zero to about 65535. The Reserved field 3045 may be set to about zero and may not be used.

Figure 31:
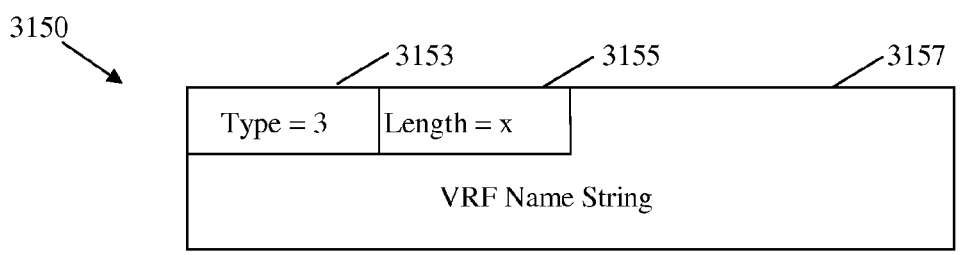
FIG. 31 is a schematic diagram of an embodiment of a VRF Name sub-TLV.

FIG. 31 illustrates one embodiment of a VRF Name sub-TLV 3150, which may describe a VRF name. The VRF Name sub-TLV 3150 may be part of the VRF Information sub-TLVs 2815 in the VRF information TLV 2800. The VRF Name sub-TLV 3150 may comprise a Type field 3153, a Length field 3155, and a VRF Name String 3157. The Type field 3153 may be set to about three or may be assigned by IANA. The Length field 3155 may vary depending on the VRF Name String 3157. The VRF Name String 3157 may comprise a name string of a VRF.

Figure 32:
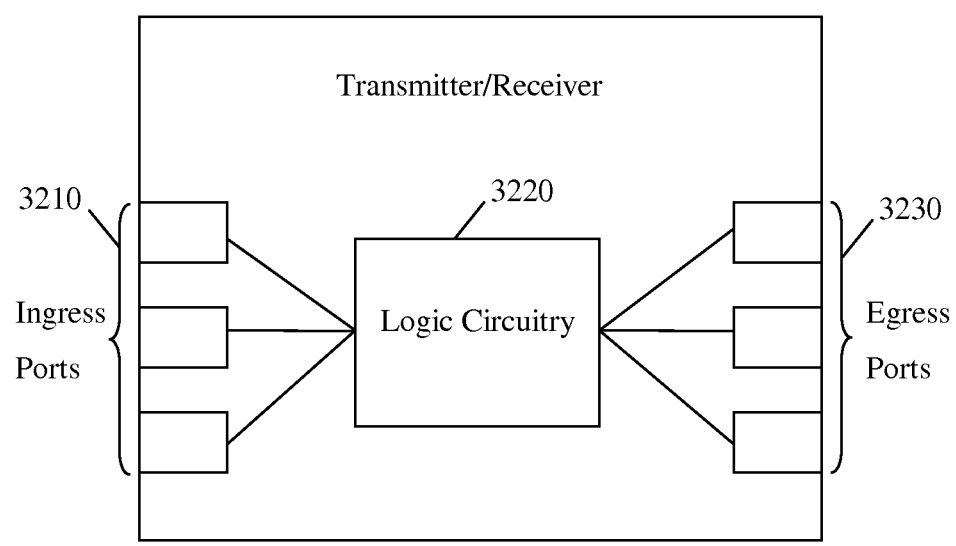
FIG. 32 is a schematic diagram of an embodiment of a transmitter/receiver unit.

FIG. 32 illustrates an embodiment of a transmitter/receiver unit 3200, which may be located at or coupled to any of the components described above. The transmitter/receiver unit 3200 may be any device that transports data through the network. For instance, the transmitter/receiver unit 3200 may correspond to or may be located in an ingress node, an internal node, or an egress node along a P2MP LSP, such as in the label switched system 200. The transmitted/receiver unit 3200 may comprise a plurality of ingress ports or units 3210 for receiving frames, objects, or type-length-values (TLVs) from other nodes, logic circuitry 3220 to determine which nodes to send the frames to, and a plurality of egress ports or units 3230 for transmitting frames to the other nodes.

Figure 33:
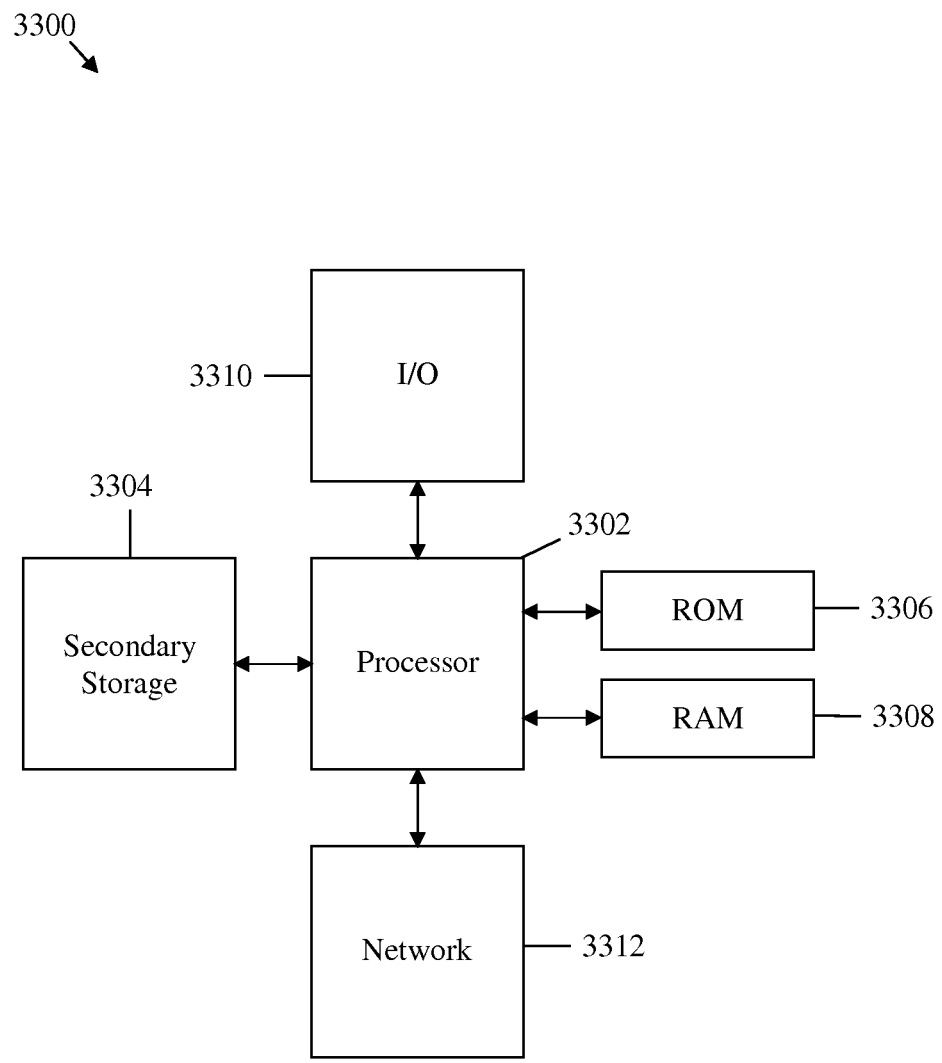
FIG. 33 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 33 illustrates a typical, general-purpose network component 3300 suitable for implementing one or more embodiments of the components disclosed herein. The network component 3300 includes a processor 3302 (which may be referred to as a central processor unit or CPU) that is in communication with memory devices including secondary storage 3304, read only memory (ROM) 3306, random access memory (RAM) 3308, input/output (I/O) devices 3310, and network connectivity devices 3312. The processor 3302 may be implemented as one or more CPU chips, or may be part of one or more application specific integrated circuits (ASICs).

The secondary storage 3304 is typically comprised of one or more disk drives or erasable programmable ROM (EPROM) and is used for non-volatile storage of data. Secondary storage 3304 may be used to store programs that are loaded into RAM 3308 when such programs are selected for execution. The ROM 3306 is used to store instructions and perhaps data that are read during program execution. ROM 3306 is a non-volatile memory device that typically has a small memory capacity relative to the larger memory capacity of secondary storage 3304. The RAM 3308 is used to store volatile data and perhaps to store instructions. Access to both ROM 3306 and RAM 3308 is typically faster than to secondary storage 3304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 45 percent, 46 percent, 47 percent, 48 percent, 44 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network comprising:
    a first edge node;
    a second edge node;
    a third edge node that backs up either the first edge node or the second edge node; and
    an internal node coupled to the first edge node, the second edge node, and the third edge node,
    wherein a primary point-to-multipoint (P2MP) label switched path (LSP) extends across the network from the first edge node, through the internal node, and to the second edge node,
    wherein a backup LSP sub-tree extends only between the third edge node and the internal node,
    wherein the internal node is a next-hop node of the first edge node on the primary P2MP LSP, and
    wherein a packet cannot be delivered across the backup LSP sub-tree to the second edge node without switching from an LSP sub-tree label for the backup LSP sub-tree to a P2MP LSP label for the primary P2MP LSP at the internal node.

2. The network of claim 1, wherein the first edge node and the third edge node are ingress nodes, wherein the second edge node is an egress node, wherein the third edge node backs up the first edge node but not the second edge node, and wherein the internal node is a next-hop node from the first edge node on the primary P2MP LSP.

3. The network of claim 2, wherein when the internal node receives data from the backup LSP sub-tree, the internal node sends the data on the primary P2MP LSP.

4. The network of claim 3, wherein the backup LSP sub-tree is a P2MP LSP sub-tree that comprises a plurality of source-to-leaf (S2L) sub LSPs.

5. The network of claim 1, wherein the first edge node is an ingress node, wherein the second edge node and the third edge node are egress nodes, wherein the third edge node backs up the second edge node but not the first edge node, and wherein the internal node is a previous-hop node from the second edge node on the primary P2MP LSP.

6. The network of claim 5, wherein the internal node sends data on the backup LSP sub-tree, but not the primary P2MP LSP, when the second edge node fails.

7. The network of claim 6, wherein the backup LSP sub-tree is a P2MP sub LSP that comprises a source-to-leaf (S2L) sub LSP.

8. An apparatus comprising:
    a backup ingress node coupled to an ingress node of a primary point-to-multipoint (P2MP) label switched path (LSP) and to a plurality of next-hop nodes for the ingress node along the primary P2MP LSP via a backup P2MP LSP sub-tree,
    wherein the primary P2MP LSP extends to a plurality of egress nodes and is configured to multicast data from the ingress node to the egress nodes,
    wherein the backup P2MP LSP sub-tree does not extend to the egress nodes,
    wherein the backup ingress node and the ingress node are both coupled to an external node,
    wherein the backup ingress node is configured to ensure data delivery from the external node onto the primary P2MP LSP via the backup P2MP LSP sub-tree at one or more of the next-hop nodes when the ingress node fails, and
    wherein delivering a packet from the backup ingress node to the egress nodes comprises switching from a backup P2MP LSP sub-tree label for the backup P2MP LSP sub-tree to a primary P2MP LSP label for the primary P2MP LSP at one or more of the next-hop nodes.

9. The apparatus of claim 8, wherein the external node sends a traffic to both the backup ingress node and the ingress node at the same time, wherein the backup ingress node sends the traffic to the next-hop nodes of the ingress node via the backup P2MP LSP sub-tree and to the ingress node, and wherein the ingress node drops the traffic from the backup ingress node when the interface between the external node and the ingress node works normally.

10. The apparatus of claim 9, wherein each of the next-hop nodes comprises a first forwarding item associated with the primary P2MP LSP and a second forwarding item associated with the backup P2MP LSP sub-tree, wherein the second forwarding item is inactive in a normal case and is set to be active when the next-hop node detects a failure in the ingress node, and wherein the next-hop node delivers the traffic that arrives from the backup P2MP LSP sub-tree to the egress nodes by using the second forwarding item.

11. The apparatus of claim 8, wherein the external node sends a traffic to both the backup ingress node and the ingress node at the same time, wherein the backup ingress node sends the traffic to the ingress node, and wherein the ingress node drops the traffic from the backup ingress node when the interface between the external node and the ingress node works normally.

12. The apparatus of claim 11, wherein the backup ingress node sends the traffic from the external node to the next-hop nodes of the ingress node via the backup P2MP LSP sub-tree when the backup ingress node detects a failure in the ingress node, wherein each of the next-hop nodes comprises a first active forwarding item associated with the primary P2MP LSP and an active second forwarding item associated with the backup P2MP LSP sub-tree, and wherein the next-hop node delivers the traffic that arrives from the backup P2MP LSP sub-tree to the egress nodes by using the active second forwarding item.

13. The apparatus of claim 8, wherein the external node sends traffic to the backup ingress node but not the ingress node when the external node detects a failure in the interface between the external node and the ingress node, and wherein the backup ingress node sends traffic to the ingress node and the ingress node sends the traffic to the egress nodes via the primary P2MP LSP.

14. The apparatus of claim 8, wherein the external node sends traffic to the backup ingress node and the ingress node and the backup ingress node sends the traffic to the ingress node, and wherein the ingress node sends the traffic from the backup ingress node to the egress nodes via the primary P2MP LSP when the ingress node detects a failure in the interface between the external node and the ingress node.

15. The apparatus of claim 8, wherein the primary P2MP LSP extends through a previous-hop node for each of the egress nodes, wherein the previous-hop nodes are each coupled to a backup egress node via a backup P2MP sub-LSP, wherein each backup egress node is associated with one of the egress nodes via coupling to an external client, and wherein the previous-hop node for the egress nodes are configured to ensure data delivery to the external client when the egress node fails.

16. An apparatus comprising:
a backup egress node coupled to an egress node of a primary point-to-multipoint (P2MP) label switched path (LSP) and to a previous-hop node for the egress node along the primary P2MP LSP via a backup LSP sub-tree,
wherein the primary P2MP LSP extends across a network from an ingress node to the egress node and a plurality of other egress nodes,
wherein the primary P2MP LSP is configured to multicast data from the ingress node to the egress node and the other egress nodes,
wherein the backup egress node and the egress node are both coupled to an external node,
wherein the backup egress node delivers the data from the primary P2MP LSP to the external node via the backup LSP sub-tree when the egress node fails, and
wherein a packet cannot be delivered across the primary P2MP LSP and the backup LSP sub-tree without switching from a primary P2MP LSP label for the primary P2MP LSP to a backup LSP sub-tree label for the backup LSP sub-tree at the previous-hop node.

17. The apparatus of claim 16, wherein the previous-hop node for the egress node establishes the backup LSP sub-tree from the previous-hop node to the backup egress node.

18. The apparatus of claim 16, wherein information about forwarding data to a client node or network from the primary P2MP LSP on the egress node is sent to the backup egress node in an egress FORWARDING object.

19. The apparatus of claim 18, wherein the egress FORWARDING object comprises an In-Label Type-Length-Value (TLV) and a Destination TLV, wherein the In-Label TLV comprises a label that has a value from about zero to about $2^{20}-1$, a Flags field that indicates a scope of the label, and an Operation field that indicates an operation on the label, and wherein the Destination TLV comprises a destination Internet Protocol (IP) address and a prefix length of the IP address.

20. The apparatus of claim 18, wherein the backup egress node creates a forwarding state for forwarding data from the backup LSP sub-tree to the client node or network using the information about forwarding data to the client node or network from the primary P2MP LSP on the egress node.

21. A network comprising:
a source node;
a primary ingress node coupled to the source node;
a backup ingress node coupled to the source node;
a plurality of egress nodes;
a next-hop node coupled to the primary ingress node, the backup ingress node, and the egress nodes;
a primary point-to-multipoint (P2MP) label switched path (LSP) configured to deliver traffic from the source node to the egress nodes via the primary ingress node; and
a backup P2MP LSP sub-tree configured to deliver traffic from the source node to the next-hop node via the backup ingress node,
wherein the backup P2MP LSP sub-tree extends only between the backup ingress node and the next-hop node, and wherein the next-hop node is configured to merge traffic carried along the backup P2MP LSP sub-tree into the primary P2MP LSP by switching from a backup P2MP LSP sub-tree label for the backup P2MP LSP sub-tree to a primary P2MP LSP label for the primary P2MP LSP upon failure of the ingress node.

22. A network comprising:
an ingress node;
a primary egress node;
a backup egress node;
a previous-hop node coupled to the ingress node, the primary egress node, and the backup egress node;
a destination node coupled to the primary egress node and the backup egress node;
a primary point-to-multipoint (P2MP) label switched path (LSP) configured to transport traffic from the ingress node to the destination node via the previous-hop node and the primary egress node; and
a backup sub-LSP configured to import traffic carried to the previous-hop node by the primary P2MP LSP to the destination node via the backup egress node by switching from a primary P2MP LSP label for the primary P2MP LSP to a backup sub-LSP label for the backup sub-LSP at the previous-hop node upon a failure of the primary egress node.

* * * * *